US008045698B2

(12) United States Patent
Annadata et al.

(10) Patent No.: US 8,045,698 B2
(45) Date of Patent: *Oct. 25, 2011

(54) ADAPTIVE COMMUNICATION APPLICATION PROGRAMMING INTERFACE

(75) Inventors: Anil K. Annadata, Milpitas, CA (US); Wai H. Pak, Hercules, CA (US); Mingtse Chen, Fremont, CA (US); Henry D. Jay, San Mateo, CA (US)

(73) Assignee: Siebel Systems, Inc., San Mateo, CA (US)

( * ) Notice: Subject to any disclaimer, the term of this patent is extended or adjusted under 35 U.S.C. 154(b) by 897 days.

This patent is subject to a terminal disclaimer.

(21) Appl. No.: 11/966,545

(22) Filed: Dec. 28, 2007

(65) Prior Publication Data

US 2008/0159520 A1     Jul. 3, 2008

Related U.S. Application Data

(63) Continuation of application No. 09/823,770, filed on Mar. 31, 2001, now Pat. No. 7,315,616.

(51) Int. Cl.
*H04M 3/00* (2006.01)

(52) U.S. Cl. ............ 379/266.01; 379/266.06; 379/266.1

(58) Field of Classification Search ............. 379/266.01, 379/266.06, 266.1
See application file for complete search history.

(56) References Cited

U.S. PATENT DOCUMENTS

| | | | |
|---|---|---|---|
| 5,287,102 A | 2/1994 | McKiel | 340/825.19 |
| 5,309,563 A | 5/1994 | Farrand | 709/216 |
| 5,473,680 A | 12/1995 | Porter | 379/221.15 |
| 5,506,898 A | 4/1996 | Constantini et al. | 379/266 |
| 5,524,147 A | 6/1996 | Bean | 379/265 |
| 5,555,365 A | 9/1996 | Selby et al. | 395/159 |
| 5,594,791 A | 1/1997 | Szlam et al. | 379/265 |
| 5,699,361 A | 12/1997 | Ding et al. | 370/431 |
| 5,715,412 A | 2/1998 | Arituska et al. | 715/729 |
| 5,734,852 A | 3/1998 | Zias et al. | 395/334 |
| 5,754,830 A | 5/1998 | Butts et al. | 395/500 |
| 5,805,886 A | 9/1998 | Skarbo et al. | 395/685 |
| 5,828,882 A | 10/1998 | Hinckley | 395/680 |
| 5,852,732 A | 12/1998 | Freund et al. | 718/101 |

(Continued)

FOREIGN PATENT DOCUMENTS

EP     1113656 A2     7/2001

(Continued)

OTHER PUBLICATIONS

GW Micro, Inc. "Window-Eyes 4.0 User's Guide," Available at http:web.archive.org/web/20010303133328/http:/www.gwmicro. com/wemanual/. Mar. 3, 2001, pp. 1-286.

(Continued)

*Primary Examiner* — Quynh Nguyen
(74) *Attorney, Agent, or Firm* — Campbell Stephenson LLP

(57) ABSTRACT

An apparatus and method for maintaining data for multi-channel communication queuing associated with different media formats such as telephone, email, and fax. A list of agent data includes information related to types of communication media an agent can access. The data can further include information related to an agent's skills, a list of media routes, statistics for communication channels of specified media types, statistics for an agent, and journals for work items. Priority values for the media routes, the maximum number of queued items for the media routes, and times for escalating a work item can also be included.

18 Claims, 41 Drawing Sheets

U.S. PATENT DOCUMENTS

| | | | | |
|---|---|---|---|---|
| 5,884,032 | A | 3/1999 | Bateman et al. | 395/200.34 |
| 5,894,512 | A | 4/1999 | Zenner | 379/265 |
| 5,905,879 | A | 5/1999 | Lambrecht | 395/297 |
| 5,915,011 | A | 6/1999 | Miloslavsky | 379/219 |
| 5,928,325 | A | 7/1999 | Shaughnessy et al. | 709/206 |
| 5,946,399 | A | 8/1999 | Kitaj et al. | 380/49 |
| 5,961,620 | A | 10/1999 | Trent et al. | 710/105 |
| 5,964,836 | A | 10/1999 | Rowe et al. | 709/221 |
| 5,974,474 | A | 10/1999 | Furner et al. | 710/8 |
| 5,983,019 | A | 11/1999 | Davidson | 395/705 |
| 5,983,184 | A | 11/1999 | Noguchi | 704/270 |
| 6,058,435 | A * | 5/2000 | Sassin et al. | 719/331 |
| 6,064,730 | A | 5/2000 | Ginsberg | 379/265 |
| 6,092,102 | A | 7/2000 | Wagner | 709/206 |
| 6,108,695 | A | 8/2000 | Chawla | 709/217 |
| 6,111,562 | A | 8/2000 | Downs et al. | 715/862 |
| 6,118,899 | A | 9/2000 | Bloomfield et al. | 382/233 |
| 6,134,318 | A | 10/2000 | O'Neil | 379/266 |
| 6,138,158 | A | 10/2000 | Boyle et al. | 709/225 |
| 6,154,209 | A | 11/2000 | Naughton et al. | 345/339 |
| 6,175,564 | B1 | 1/2001 | Miloslavsky et al. | 370/352 |
| 6,185,288 | B1 | 2/2001 | Wong | 379/219 |
| 6,199,104 | B1 | 3/2001 | Delph | 709/208 |
| 6,212,511 | B1 | 4/2001 | Fisher et al. | 1/1 |
| 6,243,452 | B1 | 6/2001 | O'Shaughnessey | 379/201.01 |
| 6,263,066 | B1 | 7/2001 | Shtivelman et al. | 379/266 |
| 6,272,216 | B1 * | 8/2001 | Vaios | 379/265.01 |
| 6,300,947 | B1 | 10/2001 | Kanevsky | 715/866 |
| 6,314,178 | B1 | 11/2001 | Walker et al. | 379/266.01 |
| 6,314,451 | B1 | 11/2001 | Landsman et al. | 709/203 |
| 6,332,154 | B2 | 12/2001 | Beck et al. | 709/204 |
| 6,337,858 | B1 | 1/2002 | Petty et al. | 370/356 |
| 6,360,368 | B1 | 3/2002 | Chawla | 725/94 |
| 6,389,132 | B1 | 5/2002 | Price | 379/265.01 |
| 6,393,475 | B1 | 5/2002 | Leong et al. | 709/223 |
| 6,449,260 | B1 | 9/2002 | Sassin et al. | 370/270 |
| 6,449,646 | B1 | 9/2002 | Sikora et al. | 709/226 |
| 6,463,292 | B1 | 10/2002 | Rahman | 455/466 |
| 6,480,600 | B1 | 11/2002 | Neyman et al. | 379/265.09 |
| 6,486,892 | B1 | 11/2002 | Stern | 715/760 |
| 6,489,951 | B1 | 12/2002 | Wong et al. | 345/173 |
| 6,493,446 | B1 | 12/2002 | Cherry | 379/265.05 |
| 6,493,695 | B1 | 12/2002 | Pickering et al. | 706/47 |
| 6,493,760 | B1 | 12/2002 | Pendlebury et al. | 709/229 |
| 6,505,166 | B1 | 1/2003 | Stephanou | 705/8 |
| 6,507,868 | B2 | 1/2003 | Simmon et al. | 709/219 |
| 6,587,556 | B1 | 7/2003 | Judkins et al. | 379/219 |
| 6,594,675 | B1 | 7/2003 | Schneider | 707/200 |
| 6,625,274 | B1 | 9/2003 | Hoffpauir et al. | 379/229 |
| 6,657,990 | B1 | 12/2003 | Dilip et al. | 370/352 |
| 6,681,010 | B1 | 1/2004 | Anderson et al. | 379/265.11 |
| 6,690,788 | B1 | 2/2004 | Bauer et al. | 379/242 |
| 6,691,162 | B1 | 2/2004 | Wick | 709/224 |
| 6,694,352 | B1 | 2/2004 | Omoigui | 709/205 |
| 6,704,409 | B1 * | 3/2004 | Dilip et al. | 379/265.02 |
| 6,718,370 | B1 | 4/2004 | Coffman et al. | 709/212 |
| 6,718,393 | B1 | 4/2004 | Aditya | 709/239 |
| 6,731,609 | B1 | 5/2004 | Hirni et al. | 370/260 |
| 6,744,878 | B1 | 6/2004 | Komissarchik et al. | 379/265.03 |
| 6,747,970 | B1 | 6/2004 | Lamb et al. | 370/352 |
| 6,763,369 | B1 | 7/2004 | Ytuarte et al. | 709/201 |
| 6,763,384 | B1 | 7/2004 | Gupta et al. | 709/224 |
| 6,771,760 | B1 | 8/2004 | Vortman et al. | 379/209.01 |
| 6,771,765 | B1 | 8/2004 | Crowther et al. | 379/265.09 |
| 6,772,216 | B1 | 8/2004 | Ankireddipally | 709/230 |
| 6,778,661 | B1 | 8/2004 | Yumoto et al. | 379/265.09 |
| 6,816,500 | B1 | 11/2004 | Mannette et al. | 370/431 |
| 6,816,880 | B1 | 11/2004 | Strandberg et al. | 709/202 |
| 6,823,384 | B1 | 11/2004 | Wilson et al. | 709/225 |
| 6,832,203 | B1 | 12/2004 | Villena et al. | 705/8 |
| 6,879,586 | B2 | 4/2005 | Miloslavsky et al. | 370/356 |
| 6,889,337 | B1 | 5/2005 | Yee | 714/1 |
| 6,895,558 | B1 | 5/2005 | Loveland | 715/746 |
| 6,944,272 | B1 | 9/2005 | Thomas | 379/88.13 |
| 6,963,783 | B1 | 11/2005 | Bi et al. | 700/94 |
| 6,978,311 | B1 | 12/2005 | Netzer et al. | 709/232 |
| 7,047,534 | B2 | 5/2006 | Sadovsky et al. | 719/322 |
| 7,051,066 | B1 | 5/2006 | Albert et al. | 709/202 |
| 7,089,497 | B2 | 8/2006 | Abbott et al. | 715/740 |
| 7,089,558 | B2 * | 8/2006 | Baskey et al. | 718/104 |
| 7,092,509 | B1 | 8/2006 | Mears et al. | 379/266.01 |
| 7,093,199 | B2 | 8/2006 | Cragun et al. | 715/763 |
| 7,120,675 | B1 | 10/2006 | Shupak et al. | 709/217 |
| 7,171,473 | B1 | 1/2007 | Eftis et al. | 709/227 |
| 7,263,547 | B2 | 8/2007 | Kloba et al. | 709/217 |
| 7,353,182 | B1 | 4/2008 | Missinhoun | 705/8 |
| 7,392,540 | B1 | 6/2008 | Pell | 726/12 |
| 2001/0039596 | A1 | 11/2001 | Collin et al. | 709/321 |
| 2001/0042131 | A1 | 11/2001 | Mathon et al. | 709/238 |
| 2001/0054064 | A1 | 12/2001 | Kannan | 709/203 |
| 2002/0026335 | A1 | 2/2002 | Honda | 705/4 |
| 2002/0032809 | A1 | 3/2002 | Bateman et al. | 710/5 |
| 2002/0042845 | A1 | 4/2002 | Burmann et al. | 709/249 |
| 2002/0055967 | A1 | 5/2002 | Coussement | 709/202 |
| 2002/0072921 | A1 | 6/2002 | Boland et al. | 705/1 |
| 2002/0087385 | A1 | 7/2002 | Vincent | 705/10 |
| 2002/0122053 | A1 | 9/2002 | Dutta et al. | 715/729 |
| 2002/0144233 | A1 | 10/2002 | Chong et al. | 717/105 |
| 2002/0191029 | A1 | 12/2002 | Gillespie et al. | 715/810 |
| 2003/0009520 | A1 | 1/2003 | Nourbakhsh et al. | 709/204 |
| 2003/0014598 | A1 | 1/2003 | Brown | 711/141 |
| 2003/0018702 | A1 | 1/2003 | Broughton et al. | 709/202 |
| 2003/0093533 | A1 | 5/2003 | Ezerzer et al. | 709/227 |
| 2003/0164848 | A1 | 9/2003 | Dutta et al. | 715/729 |
| 2004/0031030 | A1 | 2/2004 | Kidder et al. | 717/172 |
| 2005/0003812 | A1 | 1/2005 | Gladwin et al. | 455/426.1 |
| 2005/0010526 | A1 | 1/2005 | Takahashi et al. | 705/44 |

FOREIGN PATENT DOCUMENTS

| | | |
|---|---|---|
| WO | WO 97/16014 | 5/1997 |
| WO | WO 97/42728 | 11/1997 |
| WO | WO 00/49778 | 8/2000 |

OTHER PUBLICATIONS

Schmidt, et al., Experiences with an Object-Oriented Architecture for Developing Dynamically Extensible Distributed System Management Software, Nov. 28-Dec. 2, 1994, pp. 500-506.

International Search Report as mailed from the PCT on Jul. 12, 2002, for International Application No. PCT/US02/09879, 4 pages.

International Search Report as mailed from the PCT on Sep. 4, 2002, for International Application No. PCT/US02/10191, 4 pages.

International Search Report as mailed from the PCT on Feb. 28, 2003 for co-related WO Application (PCT/US02/31152; Filed Sep. 30, 2002), 5 pages.

* cited by examiner

FIG. 2a: CNCTR, Communication Channel Driver Table

| Column Name | Type | Length | Comments |
|---|---|---|---|
| CNCTR_ID | Varchar | 15 | Identifier for channel driver channel driver CNCTR. CNCTR refers to software *connector*. |
| NAME | Varchar | 75 | Name of channel driver. |
| MEDIA_TYPE | Varchar | 50 | Media type. The value of this column can be expanded by customer. |
| LIB_NAME | Varchar | 250 | File name of channel driver DLL |
| INBOUND_FLG | Char | 1 | To indicate whether this channel driver supports inbound communications |
| OUTBOUND_FLG | Char | 1 | To indicate whether this channel driver supports outbound communications |
| CNCTR_MEDIA_STR | Varchar | 100 | The media string defined by the driver vendor, which will be used at run time to invoke the media service for the channel driver. |
| DESC_TEXT | Varchar | 250 | Comments |
| UQ_DRIVER_FLAG | Char | 1 | To indicate whether this channel driver is Universal Queuing type of channel driver |

FIG. 2b: CNCTR_PARM, Channel Driver Parameter Table

| Column Name | Type | Length | Comments |
|---|---|---|---|
| CNCTR_PARM_ID | Varchar | 15 | Identifier for channel driver parameter |
| NAME | Varchar | 75 | Name of channel driver parameter |
| DFLT_VALUE | Varchar | 250 | Default value of channel driver parameter |
| CNCTR_ID | Varchar | 15 | |
| REQUIRED_FLG | Char | 1 | To indicate whether this parameter must have a value at runtime |

FIG. 2c: PROF, Communication Channel Driver Profile Table

| Column Name | Type | Length | Comments |
|---|---|---|---|
| PROF_ID | Varchar | 15 | Identifier for channel driver profile |
| NAME | Varchar | 75 | Name of channel driver profile |
| CNCTR_ID | Varchar | 15 | |

FIG. 2d: PROF_PARM, Communication Channel Driver Profile Parameter Table

| Column Name | Type | Length | Comments |
|---|---|---|---|
| PROF_PARM_ID | Varchar | 15 | Identifier for channel driver profile parameter |
| PROF_ID | Varchar | 15 | Channel Driver Profile ID |
| CNCTR_PARM_ID | Varchar | 15 | Parameter name ID |
| VALUE | Varchar | 250 | Override value of channel driver profile parameter. |

FIG. 2e: AGENT_PREF, Agent Preference Table

| Column Name | Type | Length | Comments |
|---|---|---|---|
| AGENT_PREF_ID | Varchar | 15 | Identifier for agent preference |
| EMP_ID | Varchar | 15 | |
| SETTING_NAME | Varchar | 75 | Preference name |
| SETTING_VALUE | Varchar | 250 | Preference value |
| SETTING_TYPE | Varchar | 50 | Preference type, e.g., "CTI" or "Communication" |

FIG. 2f: AGENT_STAT, Agent Status Table.

| Column Name | Type | Length | Comments |
|---|---|---|---|
| AGENT_STAT_ID | Varchar | 15 | Identifier for agent status |
| EMP_ID | Varchar | 15 | Employee ID |
| PROF_ID | Varchar | 15 | The channel driver profile ID. Agent has different status for different types of channel driver profiles. |
| NOT_READY_FLG | Char | 1 | Is agent not ready? |
| BUSY_FLG | Char | 1 | Is agent busy? |

FIG. 2g: MEDIA_STAT, Communication Media Status Table.

| Column Name | Type | Length | Comments |
|---|---|---|---|
| MEDIA_STAT_ID | Varchar | 15 | Identifier for media status |
| EMP_ID | Varchar | 15 | Employee ID |
| PROF_ID | Varchar | 15 | The channel driver profile ID of the channel driver profile to which the status corresponds. |
| MEDIA_OBJECT_STR | Varchar | 250 | The string to represent the media object (e.g. the agent's extension number, or the sender's address of an email) |
| WORKING_SINCE_DT | Date Time | 7 | Work item starting time |
| WORK_ITEM_STR | Varchar | 250 | Work item ID |

FIG. 2h: TELESET, Teleset Table.

| Column Name | Type | Length | Comments |
|---|---|---|---|
| TELESET_ID | Varchar | 15 | Identifier for teleset |
| NAME | Varchar | 30 | Teleset Name |
| HOSTNAME | Varchar | 70 | Hostname of the computer connected to the Teleset. |
| COMMENTS | Varchar | 250 | |

FIG. 2i: EXTENSION, Extension Table.

| Column Name | Type | Length | Comments |
|---|---|---|---|
| EXTENSION_ID | Varchar | 15 | Identifier for extension |
| TELESET_ID | Varchar | 15 | Teleset ID |
| DN_EXT | Varchar | 15 | Extension Information |
| EXT_ACD_QUE | Varchar | 30 | This is the ACD queue to which this extension belongs. |
| EXT_TYPE | Varchar | 30 | ACD Extension or standard extension |
| AUTO_LOGIN_FLAG | Char | 1 | Indicate if we need to login to ACD for this extension at startup. |

FIG. 2j: AGENT, Communication Agent Table.

| Column Name | Type | Length | Comments |
|---|---|---|---|
| AGENT_ID | Varchar | 15 | Identifier for agent |
| PR_CFG_ID | Varchar | 15 | The primary configuration the agent uses. |
| EMP_ID | Varchar | 15 | Employee ID |
| ACTIVE_CFG_ID | Varchar | 15 | The currently active configuration. |
| ACTIVE_TELESET_ID | Varchar | 15 | The Teleset that the agent is currently using. |

FIG. 2k: AGENT_TELSET, Communication Agent-Teleset Table

| Column Name | Type | Length | Comments |
|---|---|---|---|
| AGENT_TELSET_ID | Varchar | 15 | Identifier for agent/teleset relationship |
| AGENT_ID | Varchar | 15 | Agent ID |
| TELESET_ID | Varchar | 15 | Teleset ID |

FIG. 2l: AGENT_QUE, Agent-Queue Table.

| Column Name | Type | Length | Comments |
|---|---|---|---|
| AGENT_QUE_ID | Varchar | 15 | Identifier for agent/queue relationship |
| AGENT_ID | Varchar | 15 | Agent ID |
| ACD_QUEUE_NAME | Varchar | 30 | ACD Queue |
| AUTO_LOGIN_FLAG | Char | 1 | Indicates need to login to ACD for this extension at startup. |

FIG. 2m: AGENT_LIM, Communication Agent Limitation Table.

| Column Name | Type | Length | Comments |
|---|---|---|---|
| AGENT_LIM_ID | Varchar | 15 | Identifier for agent limitation |
| AGENT_ID | Varchar | 15 | Agent ID |
| PROF_ID | Varchar | 15 | Channel Driver Profile ID that agent cannot use. |

FIG. 2n: CFG, Communication Configuration Table.

| Column Name | Type | Length | Comments |
|---|---|---|---|
| CFG_ID | Varchar | 15 | Identifier for configuration |
| NAME | Varchar | 30 | Configuration name |
| INGRP_FLAG | Char | 1 | To indicate whether this configuration is for inbound response group used in inbound communication receiver. |
| COMMENTS | Varchar | 250 | |

FIG. 2o: CFG_PROF, Communication Configuration Channel Driver Profile Table

| Column Name | Type | Length | Comments |
|---|---|---|---|
| CFG_PROF_ID | Varchar | 15 | Configuration/channel driver profile relationship |
| CFG_ID | Varchar | 15 | Configuration ID |
| PROF_ID | Varchar | 15 | Channel Driver Profile ID |

FIG. 2p: AGENT_CFG, Communication Agent - Configuration Table

| Column Name | Type | Length | Comments |
|---|---|---|---|
| AGENT_CFG_ID | Varchar | 15 | Identifier for agent/configuration relationship |
| AGENT_ID | Varchar | 15 | Agent ID |
| CFG_ID | Varchar | 15 | Configuration ID |

FIG. 2q: CFG_PARM, Communication Configuration Parameter Table.

| Column Name | Type | Length | Comments |
|---|---|---|---|
| CFG_PARM_ID | Varchar | 15 | Identifier for configuration parameterand |
| CFG_ID | Varchar | 15 | Configuration ID |
| NAME | Varchar | 50 | Parameter Name |
| VALUE | Varchar | 50 | Parameter Value |
| ACTIVE_FLG | Char | 1 | Active flag is set if the value is valid |

FIG. 2r: CMD, Communication Command Table

| Column Name | Type | Length | Comments |
|---|---|---|---|
| CMD_ID | Varchar | 15 | Identifier for command |
| CFG_ID | Varchar | 15 | Configuration ID |
| NAME | Varchar | 70 | Command name |
| TYPE | Varchar | 50 | Command type |
| PROF_ID | Varchar | 15 | The channel driver profile ID for the channel driver profile that this command is targeting. |

FIG. 2s: CMD_PARM, Communication Command Parameter Table

| Column Name | Type | Length | Comments |
|---|---|---|---|
| CMD_PARM_ID | Varchar | 15 | Identifier for command parameter |
| CMD_ID | Varchar | 15 | Command ID |
| PARAM_NAME | Varchar | 100 | Command parameter name |
| PARAM_VALUE | Varchar | 100 | Command parameter value |

FIG. 2t: CMD_DATA, Communication Command Data Table

| Column Name | Type | Length | Comments |
|---|---|---|---|
| CMD_DATA_ID | Varchar | 15 | Identifier for command data |
| CFG_ID | Varchar | 15 | Command ID |
| NAME | Varchar | 100 | Command parameter name |
| Comment | Varchar | 200 | Comment (optional) |

FIG. 2u: CMD_DATA_PARAM, Communication Command Data Parameter Table

| Column Name | Type | Length | Comments |
|---|---|---|---|
| CMD_DATA_PARAM_ID | Varchar | 15 | Identifier for command data parameter |
| CMD_DATA_ID | Varchar | 15 | Identifier for command data |
| PARAM_NAME | Varchar | 100 | Command parameter name |
| PARAM_VALUE | Varchar | 200 | |

FIG. 2v: CMD_GROUP, Communication Command Group Table

| Column Name | Type | Length | Comments |
|---|---|---|---|
| CMD_GROUP_ID | Varchar | 15 | Identifier for group of commands |
| SUB_CMD_ID | Varchar | 15 | Foreign key to command table |
| ORDER | Number | 10 | Default "0" |

FIG. 2w: EVTHDLR, Communication Event Handler Table

| Column Name | Type | Length | Comments |
|---|---|---|---|
| EVTHDLR_ID | Varchar | 15 | Identifier for event handler |
| PROF_ID | Varchar | 15 | The channel driver profile ID for the channel driver profile from which this event originated. |
| NAME | Varchar | 100 | Event name |
| MEDIA_EVENT | Varchar | 100 | Identifier for event |
| ORDER | Number | 10 | Default "0" |
| EVT_RESP_ID | Varchar | 15 | Foreign key to event response table |
| Comment | Varchar | 200 | Comment (optional) |

FIG. 2x: HDLR_PARM, Communication Event Handler Parameter Table

| Column Name | Type | Length | Comments |
|---|---|---|---|
| HDLR_PARM_ID | Varchar | 15 | Identifier for event handler response |
| EVT_HDLR_ID | Varchar | 15 | Identifier for event handler |
| PARAM_NAME | Varchar | 100 | Event parameter name |
| PARAM_VALUE | Varchar | 200 | Event parameter value |

FIG. 2y: EVTRESP, Communication Event Response Table

| Column Name | Type | Length | Comments |
|---|---|---|---|
| EVTRESP_ID | Varchar | 15 | Identifier for event response |
| CFG_ID | Varchar | 15 | Identifier for configuration |
| NAME | Varchar | 100 | Event parameter name |
| COMMENT | Varchar | 200 | Comment (optional) |

FIG. 2z: EVTRESP_PARM, Communication Event Response Parameter Table

| Column Name | Type | Length | Comments |
|---|---|---|---|
| RESP_PARM_ID | Varchar | 15 | Identifier for event response parameter |
| EVTRESP_ID | Varchar | 15 | Identifier for event response |
| PARAM_NAME | Varchar | 100 | Event response parameter name |
| PARAM_VALUE | Varchar | 200 | Event response parameter value |

FIG. 2aa: EVTLOG, Communication Event Log Table

| Column Name | Type | Length | Comments |
|---|---|---|---|
| EVTLOG_ID | Varchar | 15 | Identifier for event log |
| CFG_ID | Varchar | 15 | Foreign key for configuration table |
| NAME | Varchar | 100 | Event parameter name |
| COMMENT | Varchar | 200 | Comment (optional) |

FIG. 2bb: LOG_PARM, Communication Event Log Parameter Table

| Column Name | Type | Length | Comments |
|---|---|---|---|
| LOG_PARM_ID | Varchar | 15 | Identifier for event log parameter |
| EVTLOG_ID | Varchar | 15 | Identifier for event log |
| PARAM_NAME | Varchar | 100 | Event log parameter name |
| PARAM_VALUE | Varchar | 200 | Event log parameter value |

FIG. 2cc: EVTRESP_LOG Event Response – Event Log Table

| Column Name | Type | Length | Comments |
|---|---|---|---|
| RESP_LOG_ID | Varchar | 15 | Identifier for response log |
| EVTRESP_ID | Varchar | 15 | Identifier for event response |
| EVTLOG_ID | Varchar | 15 | Identifier for event log |
| LOG_TYPE | Varchar | 100 | Type of EventLog declaration specified in EventResponse definition. |

FIG. 4A: TABLE UQ_CFG

| Column_Name | Type | Length | Comments |
|---|---|---|---|
| NAME | Varchar | 75 | |
| SERVER_NAME | Varchar | 75 | |
| SERVER_PORT | Number | 10 | |
| RECEIVER_NAME | Varchar | 75 | |
| RECEIVER_PORT | Number | 10 | |

FIG. 4B: TABLE UQ_CFG_PARAM

| Column_Name | Type | Length | Comments |
|---|---|---|---|
| UQ_CFG_ID | Varchar | 15 | |
| NAME | Varchar | 50 | |
| VALUE | Varchar | 50 | |

FIG. 4C: TABLE UQ_ROUTE

| Column Name | Type | Length | Comments |
|---|---|---|---|
| NAME | VarChar | 75 | User defined name of the route |
| MEDIA_TYPE_CD | VarChar | 30 | Select from value of list. Possible values include "PBX", "Web Chat", "Web Collaboration", "Fax", "E-Mail" |
| ACTIVE_FLG | Char | 1 | Indicates wheter this route is active or not. If the route is not active, information for this route will not be passed to UQ engine. |
| PRIORITY_CD | Varchar | 30 | Lower the value higher the priority. |
| CAPACITY | Number | 10 | Maximum capacity of this route. Alarm should be generated when the number of queued item exceeds the CAPACITY |
| TIME_OUT_SCND | Number | 10 | Time in second in which when the work item is not server, the first escalation rule will be effective. |

FIG. 4D: TABLE UQ_ROUTE_PROP

| Column Name | Type | Length | Comments |
|---|---|---|---|
| UQ_ROUTE_ID | Varchar | 15 | |
| NAME | Varchar | 75 | Name of the property |
| VALUE | Varchar | 75 | Value of the property |

FIG. 4E: TABLE UQ_ROUTE_ESCL

| Column Name | Type | Length | Comments |
|---|---|---|---|
| UQ_ROUTE_ID | Varchar | 15 | |
| NAME | Varchar | 75 | Name of the escalation rules |
| TIME_OUT_SCND | Number | 10 | Time in seconds in which the escalation rule will be timed out. Zero time means waiting indefinitely. |
| SEQ_NUM | Number | 10 | Order of escalation rules |

FIG. 4F: TABLE UQ_RTESCL_RUL

| Column Name | Type | Length | Comments |
|---|---|---|---|
| ROUTE_ESCL_ID | Varchar | 15 | |
| SKILL_NAME | Varchar | 50 | Skill |
| SKILL_ITEM | Varchar | 50 | If skill item is null, it is a substitution of language from the work item data property. |
| EXPERTISE | Varchar | 30 | LOV, default Value |

FIG. 4G: TABLE UQ_SKL_MAP

| Column Name | Type | Length | Comments |
|---|---|---|---|
| ROUTE_PROP_NAME | Varchar | 75 | |
| ROUTE_PROP_VALUE | Varchar | 75 | |
| SKILL_NAME | Varchar | 75 | |
| SKILL_VALUE | Varchar | 75 | |

FIG. 4H: TABLE UQ_USER_MEDIA

| Column Name | Type | Length | Comments |
|---|---|---|---|
| USER_ID | Varchar | 15 | |
| MEDIA_TYPE_CD | varchar | 30 | |
| MAX_NUM_SESSIONS | Number | 10 | Maximum session allowed. |

FIG. 4I: TABLE UQ_ROUTE_STS

| Column Name | Type | Length | Comments |
|---|---|---|---|
| ROUTE_ID | Varchar | 75 | |
| START_TS | Date Time | | |
| END_TS | Date Time | | |
| SOURCE_NAME | Varchar | 75 | Either the route name |
| AVG_WAIT_TM | Number | 10 | Waiting time during the given period |
| AVG_HANDLE_TM | Number | 10 | Handling time during the period |
| NUM_ABANDONED_REQS | Number | 10 | Number of abandoned requests |
| AVG_ABANDONING_TM | Number | 10 | |
| LONGEST_WAIT_TM | Number | 10 | Longest waiting time in seconds |
| AVAIL_USER_PCT | Number | 10 | Percentage of available agents |
| AUX_WORK_USER_PCT | Number | 10 | Percentage of auxwork agents |
| TOTAL_NUM_WORKITEMS | Number | | Total number of agents if each agent handles only one work item |
| TOTAL_NUM_UNASSIGNED_WORKITEM | Number | | |
| TOTAL_NUM_DELIVERED_WORKITEM | Number | | |
| TOTAL_NUM_SERVICE_LEVEL_WORKITEM | Number | | |
| Comments | Varchar | 250 | |

FIG. 4J: TABLE UQ_MEDIA_STS

| Column Name | Type | Length | Comments |
| --- | --- | --- | --- |
| MEDIA_TYPE_CD | Varchar | 30 | |
| START_TS | Date Time | | |
| END_TS | Date Time | | |
| SOURCE_NAME | Varchar | 75 | Either the route name |
| AVG_WAIT_TM | Number | 10 | Waiting time during the given period |
| AVG_HANDLE_TM | Number | 10 | Handling time during the period |
| NUM_ABANDONED_REQS | Number | 10 | Number of abandoned requests |
| AVG_ABANDONING_TM | Number | 10 | |
| LONGEST_WAIT_TM | Number | 10 | Longest waiting time in seconds |
| AVAIL_AGENT_PCT | Number | 10 | Percentage of available agents |
| AUX_WORK_AGENT_PCT | Number | 10 | Percentage of auxwork agents |
| TOTAL_NUM_WORKITEMS | Number | 10 | Total number of agents if each agent handles only one work item |
| TOTAL_NUM_UNASSIGNED_WORKITEM | Number | | |
| TOTAL_NUM_DELIVERED_WORKITEM | Number | | |
| TOTAL_NUM_SERVICE_LEVEL_WORKITEM | Number | | |
| Comments | Varchar | 250 | |

FIG. 4K: TABLE UQ_AGENT_STS

| Column Name | Type | Length | Comments |
|---|---|---|---|
| AGENT_ID | Varchar | 15 | |
| START_TS | Date Time | 7 | |
| END_TS | Date Time | 7 | |
| CONTACT_ID | Varchar | 15 | |
| AVAIL_PCT | Number | | Percentage available |
| BUSY_PCT | Number | | Percentage busy |
| AUX_WORK_PCT | Number | | Percentage auxwork |
| NUM_COMM_ITEM_SRVD | Number | | Number of work items served |
| Comments | Varchar | 250 | |

FIG. 4L: TABLE UQ_ERR_LOG

| Column Name | Type | Length | Comments |
|---|---|---|---|
| Name | DateTime | 7 | |
| TYPE_CD | Varchar | 30 | Either alarm or error |
| Severity | Varchar | 30 | |
| ERROR_CODE | Varchar | 10 | Alarm code or error code |
| MSG_DESC | Varchar | 250 | Template for message |

FIG. 4M: S_JOURNAL

| Column_Name | Type | Length | Comments |
|---|---|---|---|
| WORK_ITEM_ID | Varchar | 250 | Work item ID |
| ROUTE_NAME | Varchar | 75 | The name of the route. Use the actual name instead of ID because the nature of the route could be changing from time to time. |

FIG. 4N: S_JOURNAL_WORKITEM_PROPERTY

| Column_Name | Type | Length | Comments |
|---|---|---|---|
| JOURNAL_ID | Varchar | 15 | |
| Name | Varchar | 75 | Name of the property |
| Value | Varchar | 75 | Value of the property |

FIG. 4O: S_JOURNAL_ESC_HIST

| Column_Name | Type | Length | Comments |
|---|---|---|---|
| JOURNAL_ID | Varchar | 15 | |
| ESC_STEP_NAME | Varchar | 75 | |
| START_TIME | Date Time | | Start time |
| END_TIME | Date Time | | |
| RESULT | Varchar | 75 | |

FIG. 4P: S_JOURNAL_STATE_HIST

| Column Name | Type | Length | Comments |
|---|---|---|---|
| JOURNAL_ID | Varchar | 15 | |
| USERID | Varchar | 15 | |
| START TIME | Date Time | | Start time |
| END TIME | Date Time | | |
| AGENTSTATE | Varchar | 50 | |
| REASON | Varchar | 50 | |

ADAPTIVE COMMUNICATION APPLICATION PROGRAMMING INTERFACE

CROSS-REFERENCE TO RELATED APPLICATION

This application is a continuation of U.S. patent Ser. No. 09/823,770, entitled "Adaptive Communication Application Programming Interface," filed Mar. 31, 2001 now U.S. Pat. No. 7,315,616, and naming Anil K. Annadata, Wai H. Pak, Mingtse Chen, and Henry D. Jay as inventors, which is related to the subject matter of the following provisional United States patent application: "Adaptive Communication and Communication Server," naming inventors Henry Jay and Anil Annadata, filed Feb. 6, 2001, U.S. patent application Ser. No. 60/267,242. Applicants hereby claim the benefit under 35 U.S.C. §119(e) of the foregoing-referenced provisional application. The foregoing-referenced patent applications are hereby incorporated by reference herein in their entirety.

BACKGROUND

In today's emerging technological and information world, companies are interacting with their customers, potential customers and other contacts through a wide variety of different communication channels. Such communication channels include face-to-face, telephone, fax, email, voicemails, wireless communication, Internet information inquiries via call me now and call me later, Internet collaborative sessions, paging and short messaging services. With all these communication channels, companies are faced with managing each customer interaction while meeting service levels and maximizing customer satisfaction. In addition, companies are faced with optimally staffing and training their workforce to deal with customers through these communication channels whether through their customer support center(s), telebusiness organizations, or their sales, marketing, and service professionals.

Currently, many companies have dedicated email inboxes, fax inboxes, and voicemail boxes defined for specific business areas as well as automated call distributors. Employees called agents are assigned to poll and manage the support requests from customers for each communication channel. Combined with the traditional call queues for inbound telephone calls, each agent is tasked with managing his or her work using all these communication channels while not having any visibility to the queue status and priorities of each customer support request and/or communication channel.

Thus, it is desirable to provide a system that includes a universal queue strategy capable of assigning, routing, and queuing work items from multiple channels of communications to an agent having the appropriate skills to respond to the request. The system should enable the agent to view and manage his or her work items for all communication channels. Such a system reduces the response times and increases customer satisfaction, while balancing priorities amongst work items in multiple communication channels.

SUMMARY

In one embodiment, a method for inter-module communication is disclosed. The method includes defining a command definition, wherein the command definition comprises commands for interfacing with a multi-channel, multi-media, communication queuing system.

In one aspect, this embodiment includes driver object commands for requesting media type lists and command event lists, creating driver objects, requesting service, and releasing driver objects.

In another aspect, this embodiment includes service object commands for releasing service objects, notifying when handling of an event is complete, invoking commands, releasing work items, suspending work items, resuming work items, handling queued events, and cancelling queued events.

In another aspect, this embodiment includes client object commands for starting a work item, releasing work items, saving work item contexts, restoring work item contexts, serializing work items, freeing work item storage, beginning batch processing, and ending batch processing.

In another embodiment, a inter-module communication definition is disclosed. The definition includes a command definition, wherein the command definition comprises commands for interfacing with a multi-channel, multi-media, communication queuing system.

In one aspect of this embodiment, the command definition includes driver object commands to request media type lists and command event lists, create drivers, request service, and release drivers.

In another aspect of this embodiment, the command definition includes service object commands to release service objects, notify when handling of an event is complete, invoke commands, release work items, suspend work items, resume work items, handle queued events, and cancel queued events.

In another aspect of this embodiment, the command definition includes client object commands to start a work item, release work items, save work item contexts, restore work item contexts, serialize work items, free work item storage, begin batch processing, and end batch processing.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIGS. 2a through 2cc show examples of tables corresponding to table names in FIG. 2.

FIGS. 4a through 4p show examples of tables in a universal queuing database in accordance with the present invention.

The use of the same reference symbols in different drawings indicates similar or identical items.

DETAILED DESCRIPTION

FIGS. 1A through 1D are a diagram of one embodiment of a client/server system 100 for enabling agents to respond to customer support requests and/or information requests via multiple communication channels of different media types. These media types include, but are not limited to, telephone, email, fax, web collaboration, Internet call me now and call me later, web chat, wireless access protocol, paging, and short messaging services. The term customer is used herein to include individuals and contact persons at businesses that are customers of the company, potential customers and other persons with whom a customer support agent communicates.

Figure 1A:
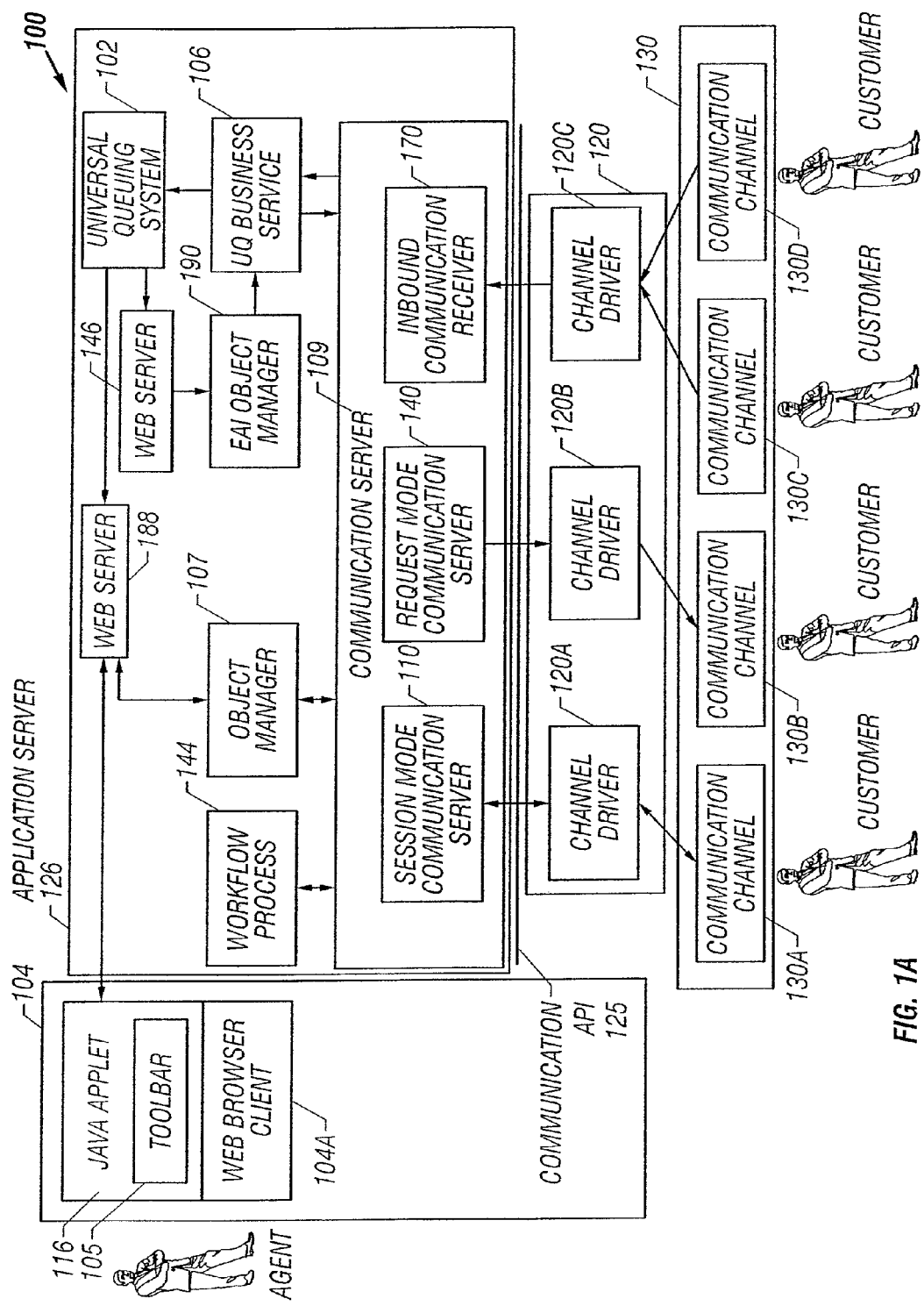
FIGS. 1A through 1D are a diagram of one embodiment of a system for enabling and scheduling agents to respond to customer support requests and/or information requests via multiple communication channels of different media types.

FIG. 1A shows that four customers have submitted customer support requests to the client/server system 100 and three agents are responding to customer support requests. The four customers submitted the customer support requests via four communication channels 130, such as communication channels 130A, 130B, 130C, and 130D. In one embodiment, at least two of the four communication channels support different media types.

In accordance with the present invention, client/server system 100 includes a universal queuing (UQ) system 102 capable of assigning, routing, and queuing work items from multiple channels of communication to an agent having the appropriate skills to respond to a customer support request. The term work item refers to a request from a customer that requires a response from an agent assigned by client/server system 100, such as responding to a customer support request in the form of a telephone call, email, fax or other communication of a different media type. A work item can be initiated when an event such as an incoming customer support request arrives or by an agent using a user interface to client/server system 100.

Client/server system 100 also includes a communication server 109 that enables agents to use communication channels of different media types to communicate with customers. Communication server 109 handles events such as the arrival of incoming customer support requests from a channel driver 120 such as one of channel drivers 120A, 120B, and 120C. Each channel driver 120 communicates with a communication channel 130 such as one of communication channels 130A, 130B, 130C and 130D.

Interaction between UQ system 102 and communication server 109 occurs when, for example, communication server 109 receives and routes an incoming customer request as a work item to UQ system 102 for assignment to an agent. UQ system 102 assigns an agent to the work item and sends the work item back to communication server 109 for communication to the assigned agent.

Web browser client 104A includes a web browser program such as Microsoft's Internet Explorer running on a client computer system (not shown). The web browser client 104A communicates with a web server 188. Application server 126 in client/server system 100 performs functions for and sends information to web browser client 104A via web server 188, which provides web pages for web browser client 104A to display. Web server 188 can download program instructions, such as Java applet 116, to the web browser client 104A to provide additional functionality, such as a user interface.

Web browser client 104A is shown including a toolbar 105. One of skill in the art will recognize that other user interfaces providing the functionality of toolbar 105 can be implemented using a variety of different display formats to interface with multiple communication channels of different media types within the scope of the invention. Toolbar 105 is presented as part of a user interface.

In one embodiment, application server 126 of client/server system 100 includes object manager 107, session mode communication server 110, request mode communication server 140, inbound communication receiver 170, UQ system 102, web server 188, web server 146, Enterprise Application Interface (EAI) object manager 190, and workflow process 144. In one embodiment, communication between components in application server 126 is enabled using a suitable inter-process communication protocol in conjunction with transfer control protocol/Internet protocol (TCP/IP) as known in the art.

UQ business service 106 allows communication server 109 to request information from UQ system 102, which returns the information via web server 146, and EAI object manager 190. In one embodiment, both session mode communication server 110 and inbound communication receiver 170 can communicate with UQ system 102. Other embodiments can communicate with a third party queuing system for maintaining work item queues and assigning agents to work items.

Communication server 109 includes session mode communication server 110. Communication server 109 may optionally include one or both of request mode communication server 140 and inbound communication receiver 170. It is important to note that the functionality provided by servers 110, 140, and 170 can be implemented on one server computer system or distributed across two or more server computer systems. Communication server 109 handles all communication between agents and customers via communication channels 130 of one or more media types. Communication server 109 is not media-specific and has no knowledge of communication channels or media.

To communicate with multiple communication channels of different media types, communication server 109 is designed to communicate with a channel driver 120 such as one of channel drivers 120A, 120B, and 120C. A channel driver 120 is written according to Communication Application Program Interface (API) 125. Communication API 125 provides an interface for third party vendors of communication devices and software (e.g., middleware vendors for communication devices) to provide a channel driver 120 so that their products are compatible with application server 126. By implementing a channel driver 120, vendors can take advantage of the customer support center management features and multi-media communication channel capabilities of application server 126.

Communication API 125 is designed to provide flexibility to third party vendors for integrating their products. In the implementation of a channel driver, a vendor defines the commands the vendor's communication channel 130 understands so that communication server 109 can issue commands for the communication channel 130 to perform. Normally these commands are issued when session mode communication server 110 is presenting a user interface to the agent, although inbound communication receiver 170 also can send commands in some circumstances.

In addition, the vendor defines the events that the vendor's communication channel 130 provides regarding activity of a specific communication channel 130. Finally, the vendor provides a channel driver 120 implementation, such as a dynamic link library (.DLL file), for performing each command and generating and providing each event. The channel driver 120 implementation is required by communication API 125 to include code to instantiate a driver object and at least one service object.

By requiring the vendor to provide facilities for the communication server 109 to issue commands to and to receive information from the vendor's communication channel 130, communications API 125 enables communications server 109 to operate independently of the command channel 130 media type and specific protocols to communicate with the vendor's communication device or software.

Figures 1, 2:
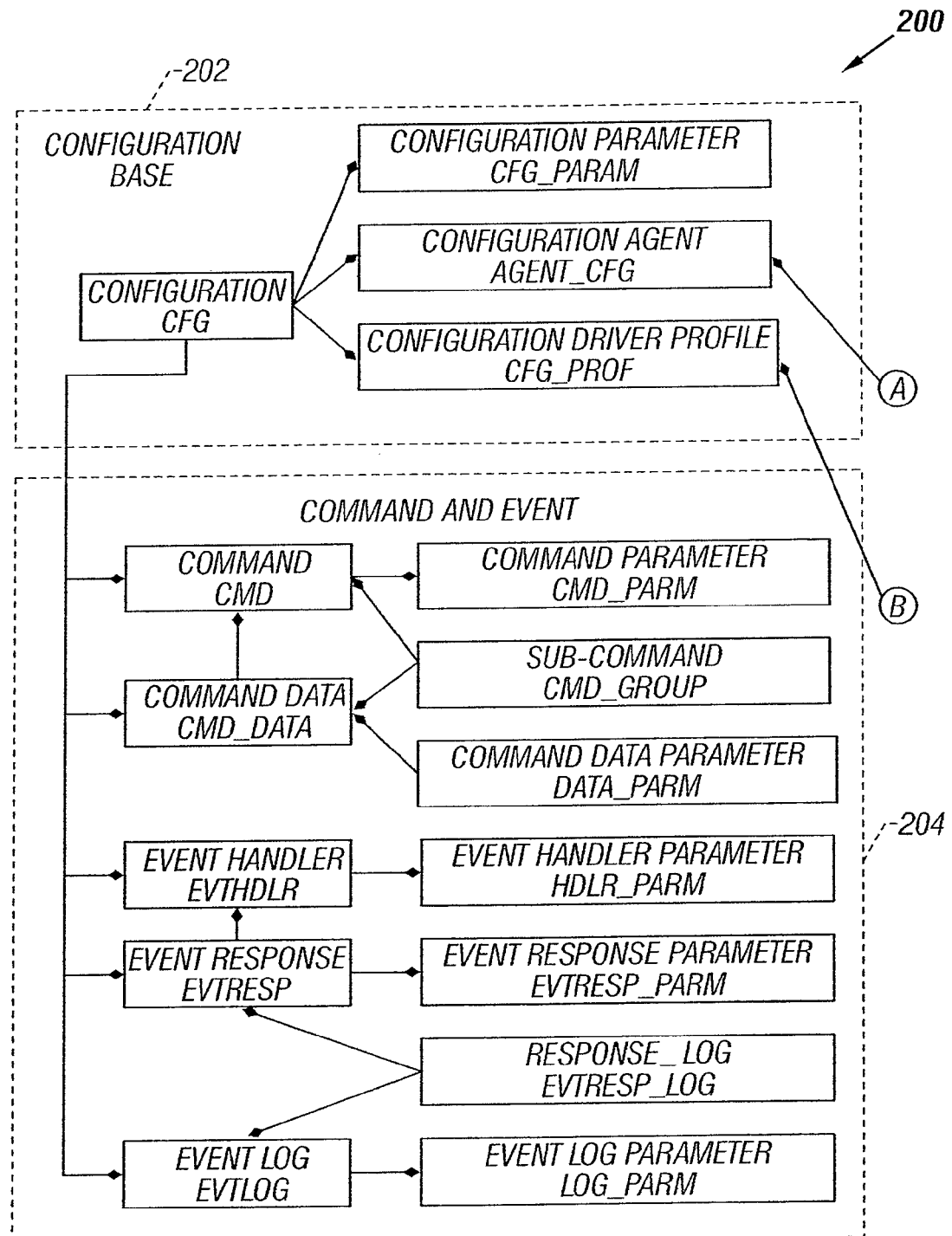
FIG. 2 shows an example of a database scheme for the system of FIGS. 1A through 1D.
Figure 2:
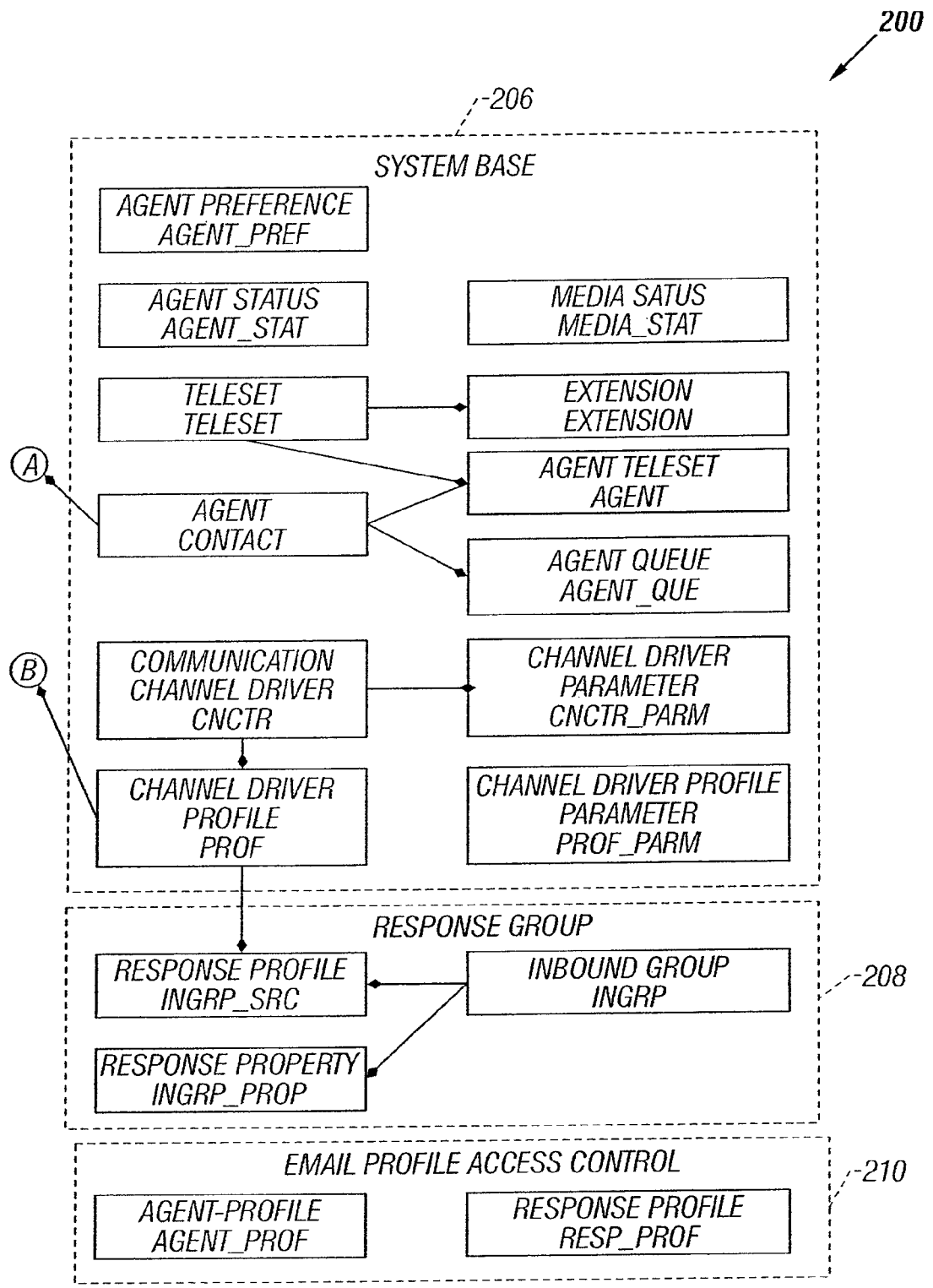

Referring to FIG. 2, an example of a database schema 200 that can be used by client/server system 100 (FIG. 1A) for storing and communicating channel driver information, agent limitations on media access, commands and events, inbound task management, agent preferences, agent status, media status, communication channel configurations, multiple queue support, and agent management is shown. Database schema 200 includes data structures for configuration base 202, command and event 204, system base 206, response group 208, and email profile access control 210.

FIGS. 2a through 2cc show examples of tables corresponding to table names in FIG. 2. Note that FIG. 2 does not indicate all of the relationships between the tables for simplicity, and that many instances of a table may exist for a particular configuration, depending on the number and types of communication channels authorized. Additionally, one skilled in the art will realize that this collection of tables, the parameters included in each table, and the storage space allowed for the parameters, is one example of how the database schema may be configured, and that other suitable arrangements can be used in accordance with the present invention.

The tables in FIGS. 2a, 2b, 2c, and 2d are part of system base 206 and store channel driver information and channel driver parameters. The tables of FIGS. 2a and 2b store the general information for a channel driver, such as channel drivers 120A, 120B, and 120C, and can be used by any customer support center configuration. The typical data stored in these tables are the file name of the channel driver DLL, the media type of the associated communication channel 130 (e.g. email, fax, etc.), a media string which is used by communication server 109 at run time to invoke a media service for the channel driver, the complete list of channel driver parameters, and the default value for each channel driver parameter. The parameters INBOUND_FLG and OUTBOUND_FLG of table CNCTR (FIG. 2a) indicate whether the channel driver 120 supports inbound and/or outbound communications.

Customer support centers can establish configurations that define the groups of agents that have similar requirements to communicate, therefore requiring access to the same communication channel 130. For example, salespersons within a company may need the ability to communicate via wireless access protocol, whereas telephone operators may not. A configuration can be established for each group within the company. A channel driver profile allows more than one customer support center configuration to share a single channel driver 120, with each additional channel driver profile overriding the values of some channel driver parameters such as the location of the channel driver DLL. For example, due to the network architecture of the company, salespersons for the company in Phoenix may use a different channel driver 120 than salespersons in Palo Alto. A channel driver profile will enable the Phoenix and Palo Alto salespersons to use the same channel driver but point to different DLLs. The term channel driver 120 is used herein to include at least one channel driver profile providing default values for the channel driver parameters.

The tables in FIGS. 2c and 2d store the channel driver profile for a particular customer support center configuration and the channel driver profile is not shared or used by other customer support center configurations. Typically, an administrator uses the table CNCTR_PARM to override a default value for a channel driver parameter for the particular customer support center configuration. Referring to FIG. 2a, the string stored in the variable CNCTR_MEDIA_STR is based on a list of names of communication media supported by the channel driver 120. An administrator enters the name of the media in the CNCTR_MEDIA_STR field in character string format. The string stored in this field is used to determine the channel driver 120 to issue a command or from which an event originated. If one channel driver 120 supports multiple types of communication media, the administrator creates one record for each media type. The following examples show the parameters in the CNCTR table for telephone, email, and web chat media:

{"XYZ Phone Driver", "Telephone", "xyz.dll", "Y", "Y", "XYZ Phone Implementation", "N"}, {"XYZ Email Driver", "Email", "xyz.dll", "Y", "Y", "XYZ Email Implementation", "N"}, {"XYZ Web Chat Driver", "Web Chat", "xyz.dll", "Y", "Y", "XYZ Web-Chat Implementation", "N"}

Note that when a work item is submitted to UQ system 102 (FIG. 1A) for agent assignment, the CNCTR_MEDIA_STR is also passed with the work item to help UQ system 102 to identify an agent with skills in using that media type.

An example of an algorithm for determining the list of channel drivers 120 for a particular agent is as follows:

1. Determine the configuration ID for the agent by searching AGENT table (FIG. 2j).

2. For the configuration ID, search the CFG_PROF table (FIG. 2o) for the list of channel driver profiles associated with the configuration.

3. For each of channel drivers 120, load the channel driver information and channel driver parameters from CNCTR, CNCTR_PARM, PROF, and PROF_PARM tables (FIGS. 2a-2d, respectively).

An example of an algorithm for loading a list of channel drivers 120 upon the agent logging in to client/server system 100 is as follows:

1. For each of channel drivers 120,
   a. If the DLL has not loaded, load the DLL
   b. Pass the channel driver parameters and ask the channel driver for the handle of a driver object.
   c. Request the handle of a service object by passing the media type of the channel driver identified in CFG_PROF (FIG. 2o) as being associated with the agent.
2. End loop By default, an agent is authorized to access all channel drivers 120 associated with the configuration to which the agent belongs. For example, if the agent belongs to "Customer support center 1," all channel driver profiles configured in "Customer support center 1" are accessible for all agents in "Customer support center 1" by default. The administrator can further limit the agent's access to channel drivers 120 using table AGENT_LIM (FIG. 2m) that lists the channel driver profiles the agent cannot access.

Agent preferences are stored in table AGENT_PREF (FIG. 2e) in a centralized database so that an agent's settings are available independently of the type of client or communication channel being used. A user interface for modifying the settings is also supplied in an embodiment of the present invention.

Embodiments of the present invention support multiple communication media channels and agent assignment with UQ system 102 (FIG. 1A). Table AGENT_STAT (FIG. 2f) stores the current working status of a particular agent for all types of media that the agent is authorized to use. From this table, the administrator can see a list of media types that agent is currently authorized to access and the status of each media type.

When the "NOT_READY_FLG" parameter in table AGENT_STAT (FIG. 2f) indicates that an agent is not ready to take work items, UQ system 102 (FIG. 1A) will not assign any work items to the agent. The "BUSY_FLG" parameter indicates that the agent is busy.

Table AGENT_STAT is updated mainly at run time. When the agent first logs on using the user interface, one record for each media type that the agent is authorized to access is created. For example, {"agent_emp_id", "Phone Control", " ", " ", "1234", " "},
{"agent_emp_id", "Email/Fax", " ", " ", "1234", " "},
{"agent_emp_id", "Web Chat", " ", " ", "1234", " "}

The records are updated according the agent's working status. For example

{"agent_emp_id", "Phone Control", "Y", " ", "1234", "Y"} indicates that agent is not ready but is talking on the phone, {"agent_emp_id", "Email/Fax", "Y", " ", "1234", " "} indicates that the agent is not ready to accept Email/Fax type of work, and {"agent_emp_id", "Web Chat", "N", " ", "1234", "Y"} indicates that the agent is ready to accept web chat type work and he or she is currently working on a web chat session.

Referring to table MEDIA_STAT (FIG. 2d), the parameter "MEDIA_OBJECT_STR" for phone is the agent's extension number. For email, it is the mailbox name or the sender's email address. For fax, it is the fax number. The form of the content of MEDIA_OBJECT_STR is defined in each of the channel drivers 120.

"WORKING_SINCE_DT" is the time the agent starts to talk on the phone, or the time the agent starts to work on a work item such as an email or fax.

"WORK_ITEM_STR" is the unique string to identify the work item and the value of the field is determined by communication server 109. The MEDIA_STAT table is updated at run time to reflect the agent's current work status. An example of an agent's data records at run time is as follows:

{"agent_id", "Phone Control", "Ext. 5216", "6/25/2000 12:34:45", "phone_item_str", "1-1S2-X7E"},
{"agent_id", "Email", "info@company.com", "6/25/2000 11:34:00", "email_item_str", "1-1S2-X7D"}

The above records show that the agent is currently talking on extension 5216 and is working on an email sent to info@company.com.

Multiple extensions and multiple queues are supported in client/server system 100 (FIG. 1A) using tables TELESET, EXTENSION, and AGENT_QUE, FIGS. 2h, 2i, and 2j, respectively. The following terms are referenced in FIGS. 2h, 2i, and 2j. The term automatic call distribution (ACD) extension refers to a type of extension that is used to log in to an ACD queue associated with an ACD switch such as ACD switch 130E. Once an extension logs in to the ACD queue, the ACD switch begins to dispatch customer calls to the extension. One ACD extension can log in to one or more ACD queues.

The term standard extension refers to a type of telephone extension that is not allowed to log in to the ACD queue. Standard extensions are mainly used for dialing outbound calls or answering internal calls. The ACD switch does not dispatch customer calls to a standard extension.

The term agent ID refers to an identifier used by client/server system 100 to identify the agent. In order for client/server system 100 to be aware of the agent's availability, each customer support center agent is assigned an agent ID. When the agent logs in to a communication channel having an ACD switch 130E, the agent ID is provided to the ACD switch 130E. Depending upon the configuration of the system, either the ACD switch 130E or UQ system 102 determines an available agent ID for the work item. Then either the ACD switch 130E dispatches the customer call to the ACD extension of the agent ID or, when UQ system 102 is used to assign agents, communication server 109 uses one of channel drivers 120 to dispatch the customer call to the ACD extension of the agent ID.

"Multiple DN" refers to multiple extensions configured for one telephone handset, and one or more extensions are ACD extensions.

"Multiple queue" means that one ACD extension can log in to multiple queues. In general, since an ACD queue is a list of agent IDs, as long as the agent ID is acceptable for ACD queue, any ACD extension can be used to login to ACD queue.

In one embodiment, a method for determining the list of extensions for an agent includes searching by the agent's ID in the AGENT table (FIG. 2j) to find the primary Teleset ID in the ACTIVE_TELESET_ID parameter, which identifies the primary handset used by the agent. The extension list is then determined from the DN_EXT parameter in the EXTENSION table (FIG. 2i). Once the list of extensions is found, all extensions that the agent uses can login to all ACD queues defined in the AGENT_QUE tables (FIG. 2l) for that particular agent.

As described above, customer support centers can establish configurations that define the groups of agents that have similar requirements to communicate, therefore requiring access to the same communication channel 130. Configuration base 202 includes tables about configurations. CFG table (FIG. 2n) contains information about configurations. Configuration data includes a configuration name and an INGRP_FLAG indicating whether this configuration is for inbound response groups used in inbound communication receiver 170. CFG_PROF table (FIG. 2*o*) is the configuration/channel driver profile relationship table showing which channel driver profiles belong to each configuration. Each configuration has a single channel driver profile.

AGENT_CFG table (FIG. 2*p*) is the agent/configuration relationship table showing which agents belong to each configuration.

CFG_PARM table (FIG. 2*q*) is the configuration parameter table. A name and a value are provided for each configuration parameter. An ACTIVE_FLG field is a flag indicating whether the value of the configuration parameter is active.

The command and event data structure 204, includes information describing commands and events implemented by channel drivers 120. This information includes associating each command with a channel driver 120 and each event with a channel driver 120.

CMD table (FIG. 2*r*) includes commands for each channel driver 120. As described above, a vendor providing a channel driver 120 specifies the commands that it supports. A command is issued to channel driver 120 by communications server 109 to perform a command using communication channel 130. Every click on a button of toolbar 105 invokes a command, which is issued to channel driver 120.

A command can have a group of associated commands which operate as subcommands. A group command includes other commands with a Subcommand keyword.

Following is an example of a single command for making a telephone call to a contact.

A command can have a command data section with a CmdData keyword to specify the data parameter in order to communicate with channel driver 120.

When a customer support center configuration includes multiple channel drivers 120, it is then possible for communication server 109 to determine which commands and events are handled by each of channel drivers 120. This configuration can also help distinguish between channel drivers 120 from different vendors that use the same name for commands performing different functions.

Following is an example of a command with a data section having a CmdData keyword

```
[Command: MakeCalltoContact]
    CmdData                   =    "MakeCalltoContact"
    DeviceCommand             =    "MakeCall"
    Description               =    "Make Call to Contact"
    Hidden                    =    TRUE
    [CmdData: MakeCalltoContact]
        BusComp               =    "Contact"
        RequiredField.'Work Phone #'     ="?*"
        Param.PhoneNumber =        "{Work Phone # : Lookup}"
```

```
[Command: MakeCalltoContact]                          Command definition
    CmdData           =    "MakeCalltoContact"        Command parameter
    DeviceCommand     =    "MakeCall"                 Command parameter
    Description       =    "Make Call to Contact"     Command param.
    Hidden            =    TRUE                       Command parameter
    [CmdData: MakeCalltoContact]                      Command data def.
        BusComp       =    "Contact"                  Command parameter
        RequiredField.'Work Phone #'    ="?*"         Command parameter
        Param.PhoneNumber =    "{Work Phone #: Lookup}"   Command
                                                          Parameter
```

Following is an example of a group command for making a telephone call to a contact:

```
[Command: MakeCallGroup]
    Hidden         =    TRUE
    Subcommand     =    MakeCalltoPhone
    Subcommand     =    MakeCalltoSRContact
    Subcommand     =    MakeCalltoSROwner
    Subcommand     =    MakeCalltoEmployee Home
```

The following example command can be either a single command or a subcommand

```
[Command: MakeCalltoPhone]                            Command definition
    CmdData           =    "MakeCalltoPhone"          Command parameter
    DeviceCommand     =    "MakeCall"                 Command parameter
    Description       =    "Make Call to {@Phone}"    Cmd param
    Hidden            =    TRUE                       Command parameter
    [CmdData: MakeCalltoPhone]                        Command data def.
    [CmdData: MakeCalltoPhone]                        Command data def.
        RequiredField.'Work Phone #'    ="?*"
        Param.PhoneNumber =    "{@Phone:
            PhoneTypeLookup}"
```

The event table contains events that are sent to communication server 109 from channel driver 120. Vendors specify the events that will be sent in channel driver 120. An event response determines how communication server 109 reacts upon receiving each media event. The process of handling an event includes the following: searching for the event handler for the event, querying a customer support center database to determine the appropriate event response, and logging the event.

An example of an event, the event handler, event response, and event log for an InboundCall event are shown below:

```
[EventHandler:OnInboundCall]                                        first stage, EventHandler definition
    DeviceEvent             = "EventRinging"                        media event definition
    Response                = "OnInsideCallReceived"                EventResponse declaration
    Filter.Call             = "?*"                                  EventHandler parameter
    Order                   = "1"                                   EventHandler order
[EventResponse:OnInboundCallReceived]                               second stage, EventResponse definition
    QueryBusObj             = "Contact"                             EventResponse parameter
    QueryBusComp            = "Contact"
    QuerySpec               = "'Work Phone #'='{ANI}'"
    SingleView              = "Service Contact Detail View"
    MultiView               = "Contact List View"
    FindDialog              = "Service Request"
    FindField.CSN           = "Ask Caller"
    FindLog                 = "LogIncomingCallContactNotFound"      EventLog declaration
    SingleLog               = "LogIncomingCallContactFound"         EventLog declaration
    Log                     = "LogIncomingCallContactNotFound"      EventLog declaration
[EventLog:LogIncomingCallContactFound]                              β EventLog definition
    Display                 = "TRUE"                                β EventLog parameters
    BusObj                  = "Action"
    BusComp                 = "Action"
    LogField.Type           = "Call - Inbound"
    LogField.'Account Id'       = "{Contact.'Account Id'}"
    LogField.'Contact Id'       = "{Contact.Id}"
    LogField.Description        = "Inbound call"
    LogField.'Call Id'          = "{ConnID}"
    AfterCall.'ACD Call Duration'=
    "{@CallDuration}"
```

Each event handler corresponds to an event provided by channel driver 120 and it is sequenced among the event handlers for an event. Each event handler has an event response. An event response can be shared among event handlers. An event response can have multiple event logs, and an event log can be shared among event responses.

When operating in session mode, communication server 109 is under the control of session mode communication server 110. Session mode communication server 110 receives incoming events such as customer support requests and communicates interactively with the agent by controlling a user interface presented to the agent. Preferably the incoming customer support request is communicated to the agent at substantially the same time the customer support request is received by the communication channel 130, with brief intermissions only to allow for processing and transport time in transporting the customer support request. This ensures that the customer's waiting time is minimized, particularly for requests for live interaction with an agent.

When an event such as arrival of an incoming telephone call occurs, the user interface notifies the agent using a notification function to change the user interface to capture the agent's attention. For example, a notification function can cause a button to blink to notify the agent of the phone call. A notification function can also display other information such as information about the caller before the agent picks up the phone. When the agent uses toolbar 105 to accept a telephone call, put a call on hold, or release a call, the user interface sends a command to session mode communication server 110, which communicates with one of channel drivers 120 to issue the command to the communication channel controlling the telephone.

Session mode communication server 110 also handles establishing and maintaining connections to one or more communication channels 130, such as communication channels 130A through 130D. Session mode communication server 110 uses one of channel drivers 120, such as channel driver 120A, to establish the connection. Having a connection to a communication channel enables the agent to receive an incoming work item, such as an email, intended specifically for that agent in real time. The connection can be to a middleware server, to a web server, directly to a media device, or to any other communication intermediary from which the customer can receive a communication. The connection can be established as a TCP/IP socket connection to a middleware server, as an OLE interface such as the IadviseSink interface, or as any other suitable inter-process communication scheme. Each of channel drivers 120 contains all information needed to establish the connection with communication channel 130 so that communication server 109 operates independently of communication channel 130.

Figure 1B:
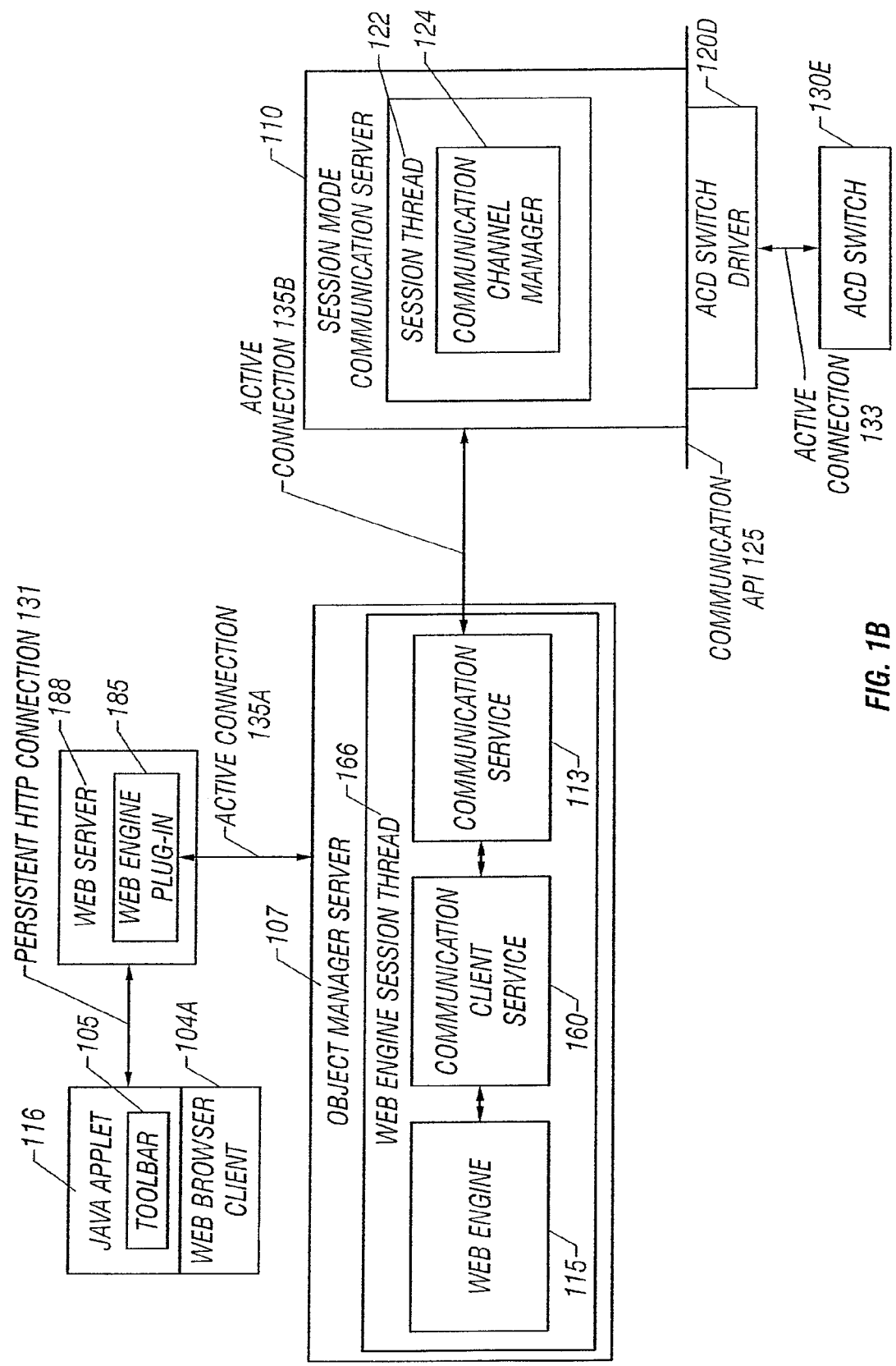

FIG. 1B shows a detailed view of one embodiment of session mode communication server 110. Session mode communication server 110 maintains knowledge of clients 104 to which it is connected, here web browser client 104A. When a communication from communication channel 130, here ACD switch 130E is received, communication server 109 dispatches the request to the appropriate server component in client/server system 100 for execution.

Session thread 122 represents a session during which an agent interacts with client/server system 100 using web browser client 104A. A customer uses a customer communication device, here a telephone, to access the communication channel. The agent also uses a communication device, such as a telephone headset, to access the communication channel.

Session thread 122 listens for inputs from its web browser client 104A and dispatches notifications of events from ACD switch driver 120 to web browser client 104A. Session thread 122 uses a communication channel manager such as communication channel manager 124 to interact with a ACD switch driver 120. Each channel driver 120 provides an active connection such as active connection 133 between the client and the associated communication channel. Channel driver 120 can be implemented to establish a persistent connection for interactive communication between client 104 and communication channel 130E but providing a persistent connection is not required by communication API 125.

The following examples describe processes that are followed by web browser client 104A during startup, initialization and operation. The processes for web browser client 104A are applicable to other types of clients, as will be explained in further detail below.

When web browser client 104A begins execution:

1. Web browser client 104A downloads program instructions for generating a user interface on the display for the web browser, such as toolbar 105, shown here for implemented using Java applet 116, from web server 188. Java applet 116 also establishes persistent HTTP connection 131 between Java applet 116 and web server 188 so that web server 188 can continuously provide information to web browser client 104A.

2. Web browser client 104A interfaces with session mode communication server 110 via web engine session thread 166. Object manager 107 spawns web engine session thread 166 to interface with web browser client 104A using web engine plug-in 185 and web engine 115. Communication client service 160 provides all communication related to the user interface with web browser client 104A.

3. Communication client service 160 requests the object manager 107 for communication service. Communication service 113, which provides all communications not related to the user interface, is provided.

4. Communication service 113 loads configuration information such as commands, events, agent information and preferences, channel driver information and channel driver parameters.

5. Communication service 113 registers an asynchronous event receiving function with object manager 107 to be invoked when an asynchronous event is subsequently received. The asynchronous event receiving function is also referred to as a callback function. Receiving asynchronous events is described in further detail below.

6. Communication service 113 request an active connection 135A between object manager 107 and web engine plug-in 185 and an active connection 135B between communication service 113 and session mode communication server 110. Persistent HTTP connection 131, and active connections 135A and 135B enable session mode communication server 110 to continually push user interface changes to toolbar 105 using Java applet 116.

7. Session mode communication server 110 spawns a session thread such as session thread 122 in response to the connection request.

8. Session thread 122 runs communication channel manager 124.

9. Communication channel manager 124 loads ACD switch driver 120D and passes the channel driver parameters determined by communication service 113.

10. ACD switch driver 120D establishes an active connection 133 to the ACD switch 130E. A vendor implementing channel driver 120 may choose to provide a persistent connection to the communication channel 130, as for telephone connections such as active connection 133. However, a persistent connection is not required by communication API 125.

When the agent performs an activity using web browser client 104A that requires a command to be executed, such as clicking a button on toolbar 105:

1. Communication client service 160 searches the command configuration data previously loaded for the command to invoke. It also collects the data associated with that command and then passes the command and data to communication service 113.

2. Communication service 113 passes the command and data to communication channel manager 124.

3. Communication channel manager 124 then determines which of channel drivers 120 performs the command requested by the client, and passes the command and data to the channel driver 120 such as ACD switch driver 120D for execution.

4. ACD switch driver 120D issues the command to the communication channel 130. In this example, the ACD switch driver 120D issues the command to ACD switch 130E.

When a channel driver 120 such as ACD switch driver 120D needs to push an event (status data or an incoming event such as a customer call) to web browser client 104A:

1. ACD switch driver 120D receives the event and posts the event to communication channel manager 124. This requires asynchronous interruption at session thread 122 for event posting.

2. Communication channel manager 124 pushes the event to communication service 113.

3. Communication service 113 receives the event and executes the registered asynchronous event receiving function.

4. The registered asynchronous event receiving function inserts the event sent from ACD switch driver 120D into an event queue stored inside object manager 107.

5. A frame manager (not shown) running in session thread 122 picks up the event from the event queue and invokes the registered asynchronous event receiving function using communication client service 160.

6. Communication client service 160 asks communication service 113 to process the event.

7. After communication service 113 has processed the event, communication client service 160 continues to communicate with Java applet 116 to control the web browser for user interface changes.

Figure 1C:
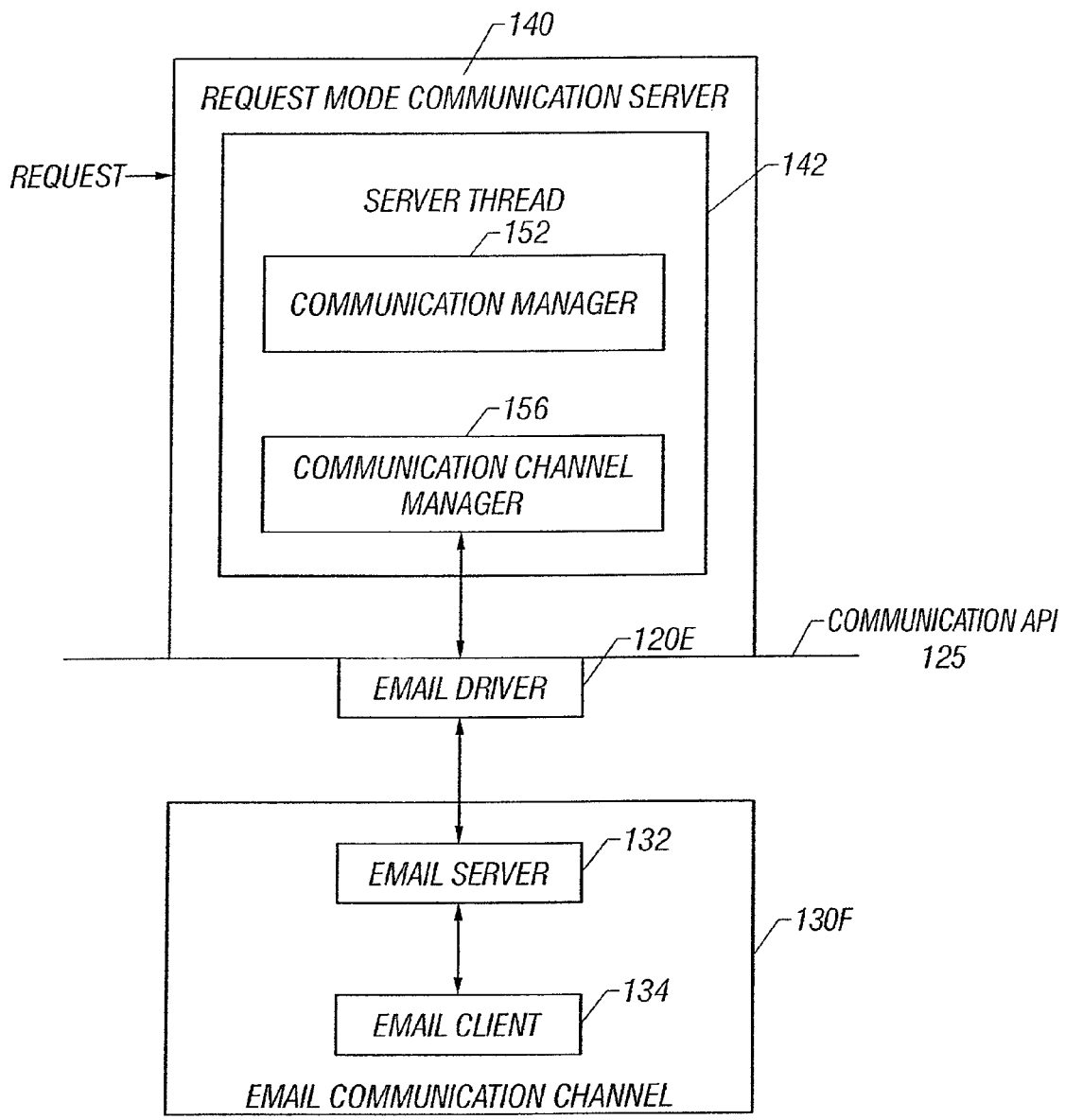

FIG. 1C shows components included in one embodiment of request mode communication server 140. Request mode communication server 140 handles the distribution of information via communication channels according to the request. An example of the operation of request mode communication server 140 is session mode communication server 110 sending a request to request mode communication server 140 to send a large number of emails on its behalf. This enables session mode communication server 110 to devote its resources to controlling the user interface, issuing commands, and handling events.

A request mode server thread such as server thread 142 is spawned when request mode communication server 140 begins execution. Communication manager 152 is loaded to collect data for the request. Request mode communication server 140 determines the appropriate channel driver to handle the request and directs a communication channel manager 156 to load email driver 120E. Communication channel manager 156 dispatches the request and data to email driver 120E, which sends the information to email communication channel 130F. In the embodiment shown in FIG. 1C, email driver 120E sends the emails via email server 132 to email client 134.

As another example of the operation of request mode communication server 140, object manager 107 can send one or more work items from UQ system 102 to request mode communication server 140. Similar to the previous example, a request mode server thread is spawned and communication manager 152 is loaded to collect data for the request. Request mode communication server 140 determines the appropriate channel driver to handle the request and directs a communication channel manager 156 to load an appropriate driver, such as email driver 120E. Communication channel manager 156 dispatches the request and data to the driver, which sends the information to a communication channel.

Figure 1D:
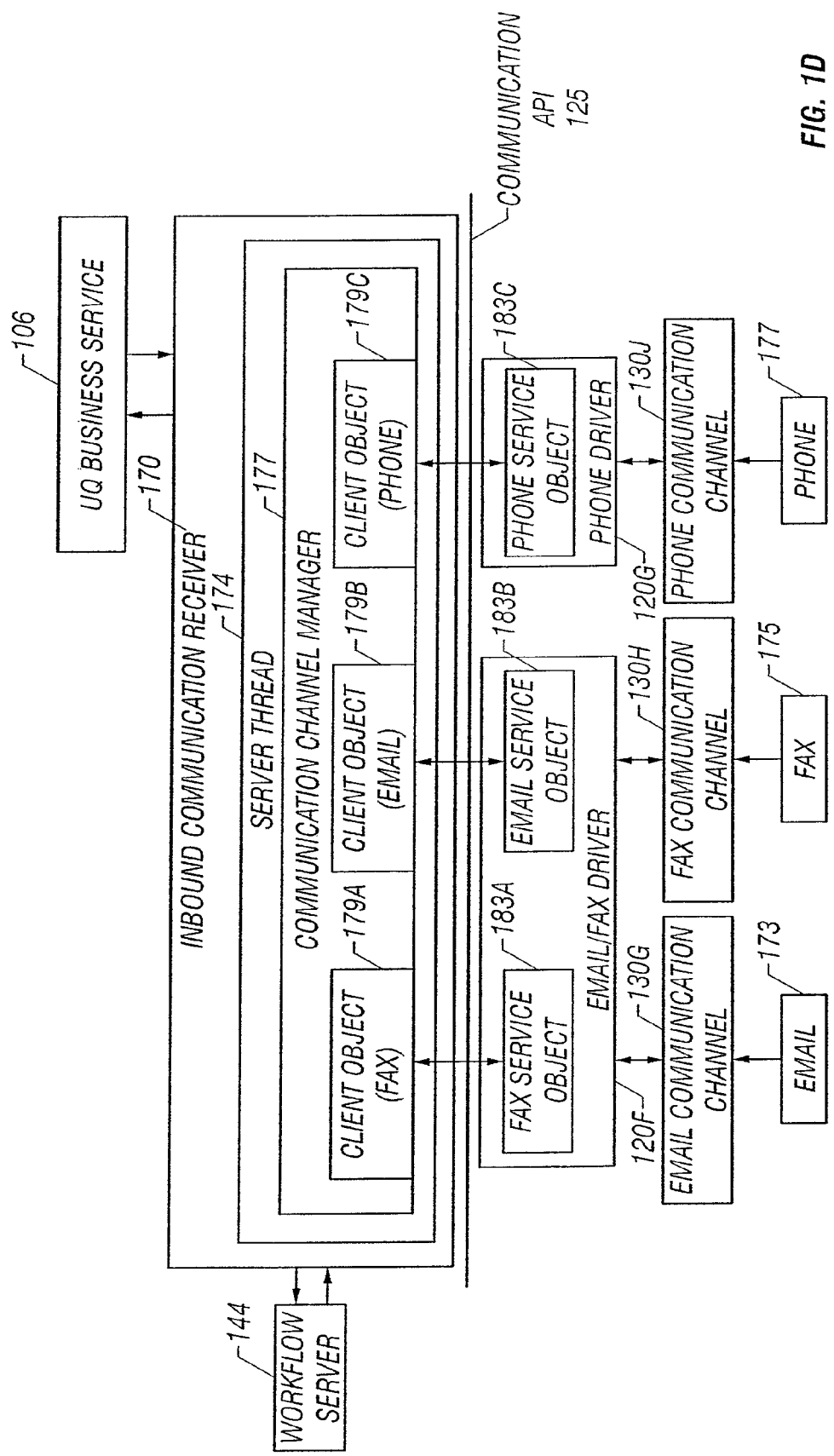

FIG. 1D shows an example of one implementation of inbound communication receiver 170. One embodiment of inbound communication receiver 170 is designed to serve inbound customer support requests with no connection to or knowledge of a client. This contrasts with session mode communication server 110, which communicates with a client to provide a user interface to at least one agent. In one implementation, inbound communication receiver 170 handles customer support requests that can be held in a queue for future processing, such as fax and email, whereas session mode communication server 110 handles high priority support requests that should be processed as quickly as possible, such as telephone calls, to improve customer response time. In another implementation, both inbound communication receiver 170 and session mode communication server 110 can handle high priority support requests.

Inbound communication receiver 170 uses channel drivers 120 such as email/fax channel driver 120F to "listen" for particular types of customer support requests from a common source. Email channel driver 120F handles all email messages directed to a particular email address and all faxes sent to a particular fax number. To avoid overlap among agents, inbound communication receiver 170 can be configured to work with UQ system 102 to assign an agent to the inbound customer support request (email 173 or fax 175) and route the customer support request to a component associated with or representing the assigned agent, such as a client.

Inbound communication receiver 170 is also configured during initialization to recognize events, such as receiving a customer support request, and to include corresponding channel driver information and background profiles to handle recognized events. Background profiles include one or more monitored media objects, such as a list of email addresses, fax numbers, and web-chat end points. For example, email communication channel 130G represents a background profile for info@company.com and fax communication channel 130H represents a background profile for fax number 1-800-123-4567.

Inbound communication receiver 170 spawns a server thread such as server thread 174 to handle inbound events, such as customer support requests. This contrasts to session mode communication server 110, which spawns a session thread such as session thread 122 for each client 104 being used by an agent. Communication channel manager 177 then initializes a service such as fax service object 183A, email service object 183B, or phone service object 183C with the designated background profile.

When the email/fax channel driver 120F receives an incoming customer support request, e.g. new fax 175, fax channel driver 120F posts the event to communication channel manager 177. This posting interrupts the idle state of server thread 174 and causes server thread 174 to invoke communication channel manager 177 to process the event. Communication channel manager 177 determines how to respond to the event based on an event response included in an event response table, such as EVTRESP (FIG. 2*y*), and invokes the appropriate media service, such as fax service object 183A. If the event response also specifies notifying UQ system 102 of the event, the event is then passed to UQ system 102 via UQ business service 106. A response to the event notification is returned to inbound communication receiver 170 via UQ business service 106.

Figure 1E:
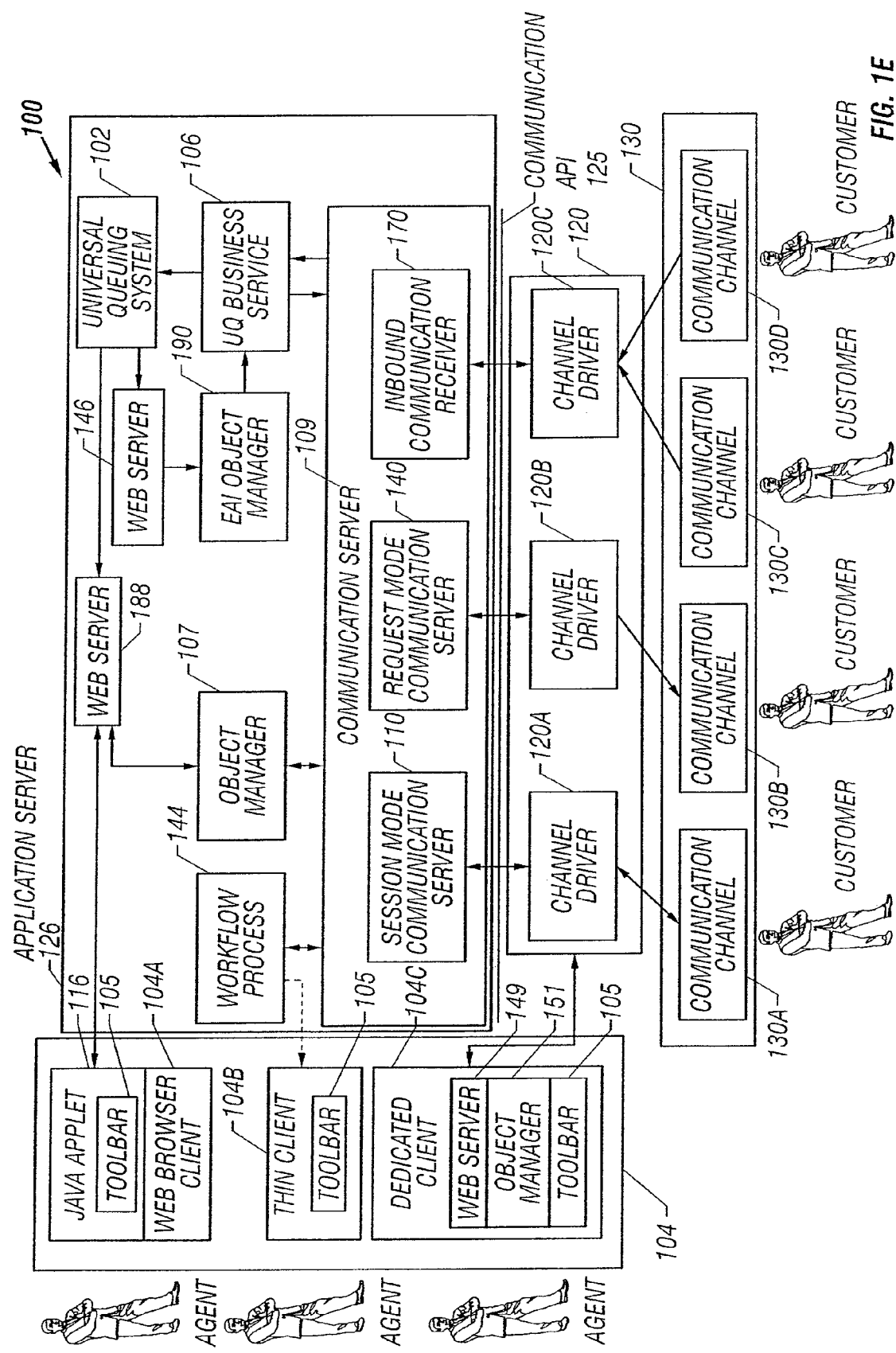
FIG. 1E is a diagram of another embodiment of a system for enabling and scheduling agents to respond to customer support requests and/or information requests via multiple communication channels of different media types.

In alternative embodiments, client/server system 100 can support multiple types of clients 104 having hardware/software configurations that are different from web browser client 104A. FIG. 1E shows an alternative embodiment of client/server system 100 that supports web browser client 104A, thin client 104B, and dedicated client 104C.

Thin client 104B includes one or more client software modules that are installed and executed on the client computer system used by the agent. Thin client 104B provides minimal functionality, with the majority of the functions for thin client 104B are performed by application server 126. It is often desirable to use thin clients so that application programs can be updated once in a centralized location instead of multiple times for each thin client 104B.

Thin client 104B provides more functionality on the client side than web browser client 104A, and can, for example, perform some functions of object manager 107. Thin client 104B also controls the user interface including toolbar 105. If changes are necessary to the functions performed on the client side, a new copy of thin client 104B must be installed on each individual agent's computer system.

Dedicated client 104C includes software modules that perform a significant portion of the functions required to support an agent. Dedicated clients are sometimes referred to as "fat clients," in contrast to the "thin client" designation. If changes are necessary to the functionality provided by dedicated client 104C, a new copy of the dedicated client software modules usually must be installed on the client computer system.

Dedicated client 104C provides even greater functionality than does thin client 104B, including, for example, all functionality provided by object manager 107, web server 188, communication client service 160 (FIG. 1B), and communication service 113. Because dedicated client 104C assumes all responsibility for the user interface and toolbar 105, there is no communication between dedicated client 104*c* and communication server 109, web server 188, web engine plug-in 185 and web engine 115 (FIG. 1B). Dedicated client 104C does include web server 149 that is capable of interfacing with UQ system 102, and object manager 151 to communicate with channel drivers 130.

It is important to note that other types of clients having hardware and software components that are different from clients 104A, 104B, and 104C can also be integrated with client/server system 100.

Communication API

Referring now to FIGS. 1F-1J, communication API 125 is provided in one embodiment of the present invention for channel drivers 120 to communicate with communication server 109. Note that communication server 109 is used in the following discussion of communication API 125 to represent session mode communication server 110, request mode communication receiver server 140, or inbound communication receiver 170.

Figure 1F:
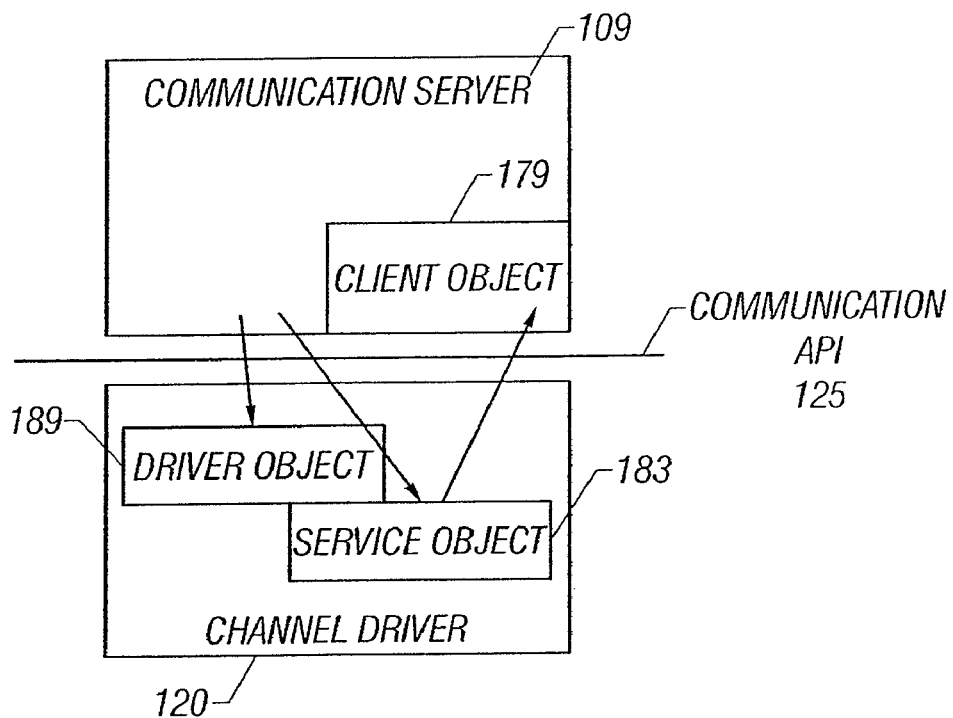
FIG. 1F is a diagram of components included in an implementation of a communication application programming interface.

As shown in FIG. 1F, one embodiment of communication API 125 includes three types of objects: driver objects 189, service objects 183, and client objects 183. Driver objects 189 and service objects 183 are instantiated at the channel driver 120, however client objects 179 are instantiated at communication server 109. Communication server 109 interfaces with driver objects 189 and service objects 183, but only service objects 183 communicate with client objects 179.

Driver objects 189 maintain the instantiation of service objects 183. Any special steps for constructing and destructing service objects 183 can be implemented in driver objects 189. Multiple driver objects 189 can be included to manage different types of media. Also, a single driver object 189 can manage one type of service objects 183 or different types of service objects 183. For example, a single driver object 189 can manage phone, email and fax media.

As an example of the operation of driver objects 189, when communication server 109 is starting up, the channel driver 120 data link library (DLL) is loaded. Communication server 109 calls CreateISCSDriverInstance( ) in channel driver 120 to ask for the construction of a driver object 189. The channel driver 120 returns the driver handle back to communication server 109. The channel driver 120 determines how driver objects 189 are created. If driver objects 189 already exist, for example, the channel driver 120 could simply pass the handle of an existing driver object 189 instead of creating a new one.

In one embodiment, service objects 183 are created by driver objects 189 and provide functionality in the form of device commands to interact with the associated media type. For example, making an outbound call, or sending an outbound email is implemented at service objects 183. A service object 183 is usually associated with a single type of media. For example, there can be service objects 183 for phone media and other service objects 183 for email media. Communication server 109 interfaces directly with service objects 183 to invoke a device command.

After communication server 109 obtains the driver handle, communication server 109 uses a RequestService( ) function to request a service object 183 for the specified media type. The driver returns the handle of the corresponding service object 183 to communication server 109. Communication server 109 then uses this handle in an InvokeCommand( ) function directly to request the corresponding service object 183 for executing a particular type of function.

After communication server 109 obtains the handle to a service object 183, Communication server 109 will use the service handle directly to interact with the service object 183. Service objects 183 can inherit facilities from, and/or share resources with, driver objects 189. For example, driver objects 189 can maintain the physical TCP/IP connection to a middleware server and service objects 183 can share the connection with the driver objects 189.

Client objects 179 are instantiated and implemented by communication server 109. The handles to client objects 179 are passed to service objects 183. Service objects 183 can utilize the client handles and invoke the function to be executed at communication server 109.

In one embodiment, every service object 183 has a corresponding client object 179. Therefore, each client object 179 has knowledge of the media type that its corresponding service object 183 is using. Since service objects 183 can each be instantiated for different media from different driver DLLs, this one-to-one relationship allows a client object 179 to know the driver object 189 and service object 183 that initiate the notification when client object 179 receives notification from service object 183.

Figure 1G:
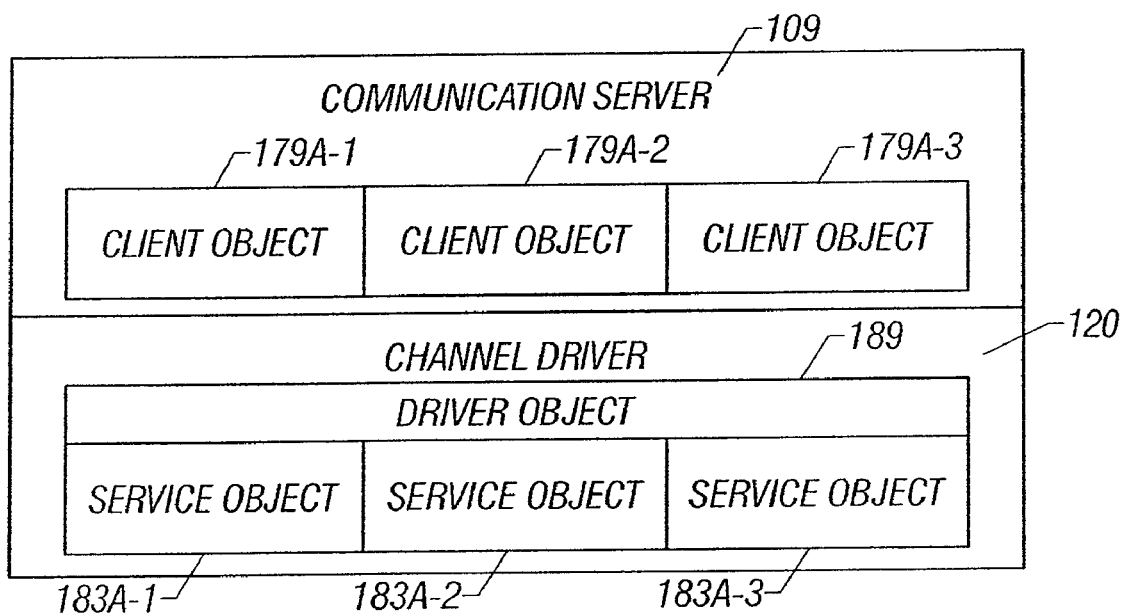
FIG. 1G is a diagram of components included in another implementation of a communication application programming interface.

FIG. 1G shows an example of an architecture for driver object 189 instantiated by channel driver 120. Driver object 189 creates three service objects 183A-1, 183A-2, and 183A-3 of the same media type, such as email. Each service object 183A-1, 183A-2, and 183A-3 has its own dedicated client object 179A-1, 179A-2, and 179A-3, respectively.

Figure 1H:
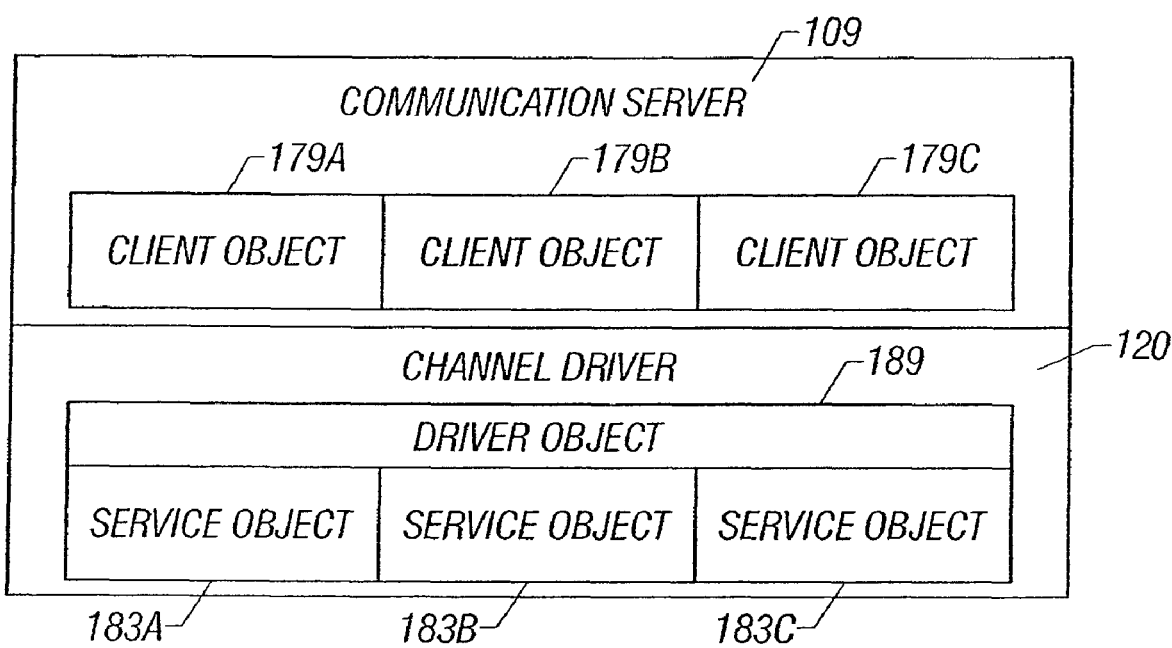
FIG. 1H is a diagram of components included in another implementation of a communication application programming interface.

FIG. 1H shows an alternative architecture for driver object 189 that creates three service objects 183A, 183B, and 183C for different types of media. Each service object 183A, 183B, and 183C has its own dedicated client object 179A, 179B, and 179C, respectively, for processing events with the corresponding media type. An example of this architecture is shown in FIG. 1D for inbound communication receiver 170 that includes client object 179A for handling fax media, client object 179B for handling email media, and client object 179C for handling phone media. Client objects 179A, 179B, and 179C correspond to fax service object 183A, email service object 183B, and phone service object 183C, respectively.

Figure 1I:
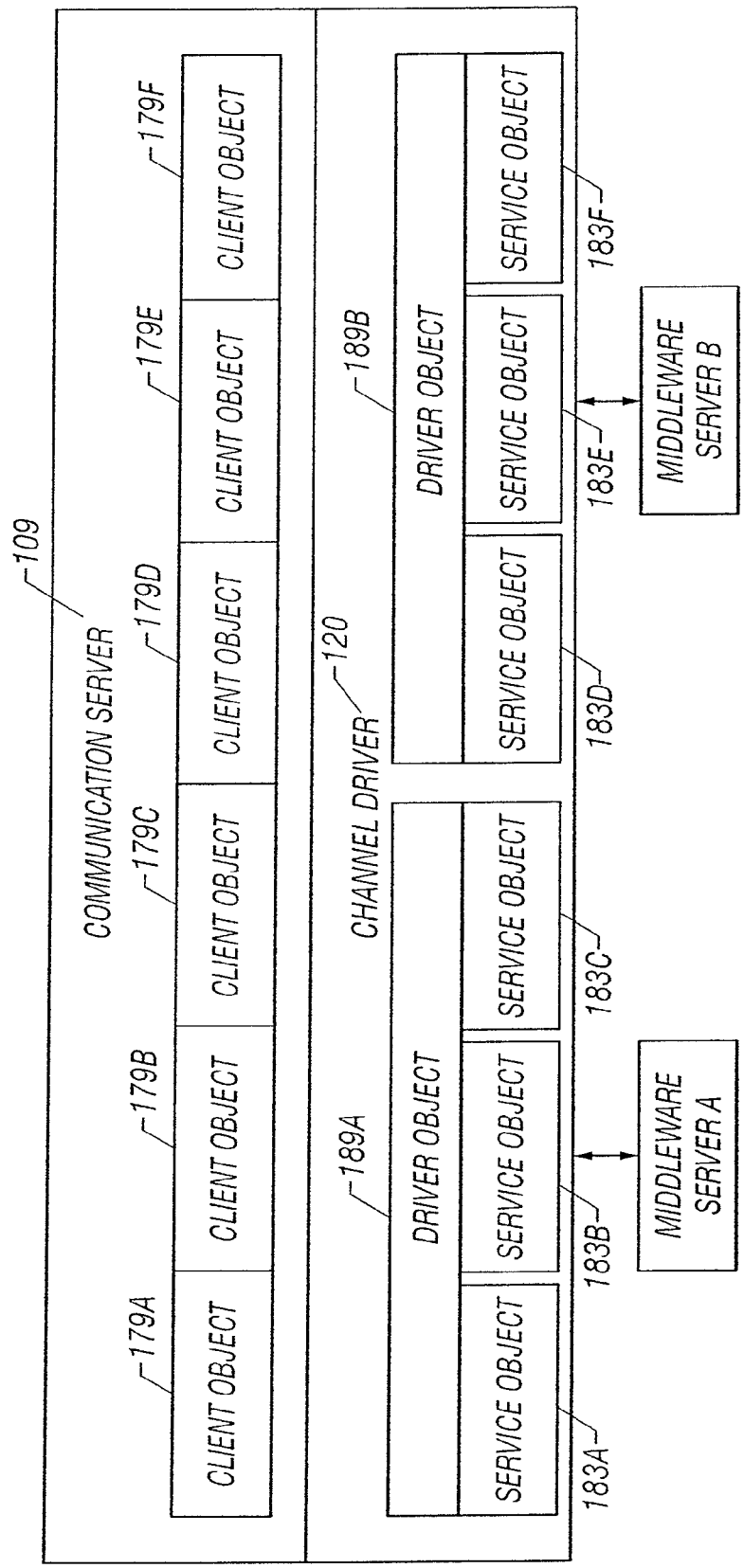
FIG. 1I is a diagram of components included in another implementation of a communication application programming interface.

FIG. 1I shows two driver objects 189A, 189B instantiated in the channel driver 120. Each driver object 189A, 189B is designated for a different middleware server and includes resources specific to the type of middleware server. For example, driver object 189A may use a TCP/IP connection to Middleware Server A and driver object 189B may have a direct connection to Middleware Server B. The service objects 183 created under each driver object 189A, 189B are specific to the middleware server with which the driver object 189A, 189B is associated.

There are several alternatives for implementing asynchronous notification of events from middleware servers to driver objects 189 including:

1. Traditional TCP/IP socket. The driver objects 189 connect to the TCP/IP port of a middleware server. Events are sent through TCP/IP connection.
2. OLE interface. One example is the IAdviseSink interface in OLE.
3. Any other inter-process communication scheme.

With alternative 1, since the driver objects 189 can be implemented as a DLL, the driver object DLL either constructs a listening thread which blocks on select( ) call until the arrival of event, or a polling thread which periodically polls the middleware server for the arrival of event. Polling threads are useful for low-priority media types, e.g. email or fax, because polling periods typically last seconds or minutes. Polling threads are not as useful to detect high-priority media events, such as phone requests, because it is desirable to report the arrival of incoming call at anytime. Listening threads generate less network traffic than polling threads, and are generally useful for high priority and low priority media, however, some types of middleware servers do not support listening threads.

To implement both polling threads and listening threads, a "task" thread is required in the driver object DLL. The "task" thread can be executed in driver objects 189 as shown in FIG. 1J or in service objects 183 as shown in FIG. 1K.

Figure 1J:
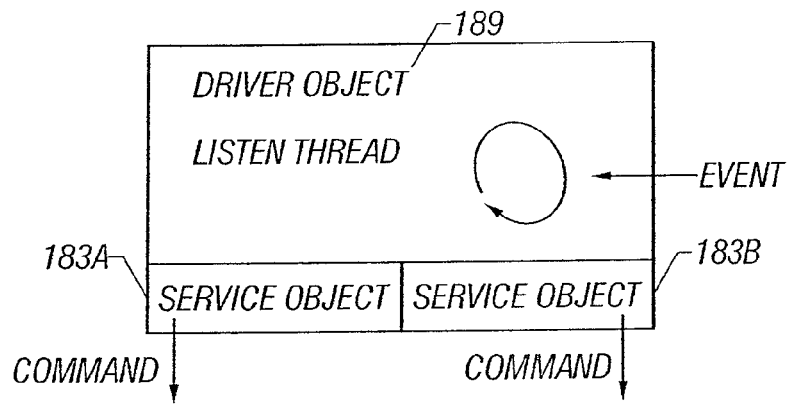
FIG. 1J is a diagram of components included in another implementation of a communication application programming interface.

Referring to FIG. 1J, a task thread (or listen thread) implemented in the driver objects 189 may be "shared" by all service objects 183. For example, this listen thread can listen for all incoming events for all service objects 183. Once the listen thread receives an event, the listen thread then invokes and executes the event handling function implemented at service objects 183.

Figure 1K:
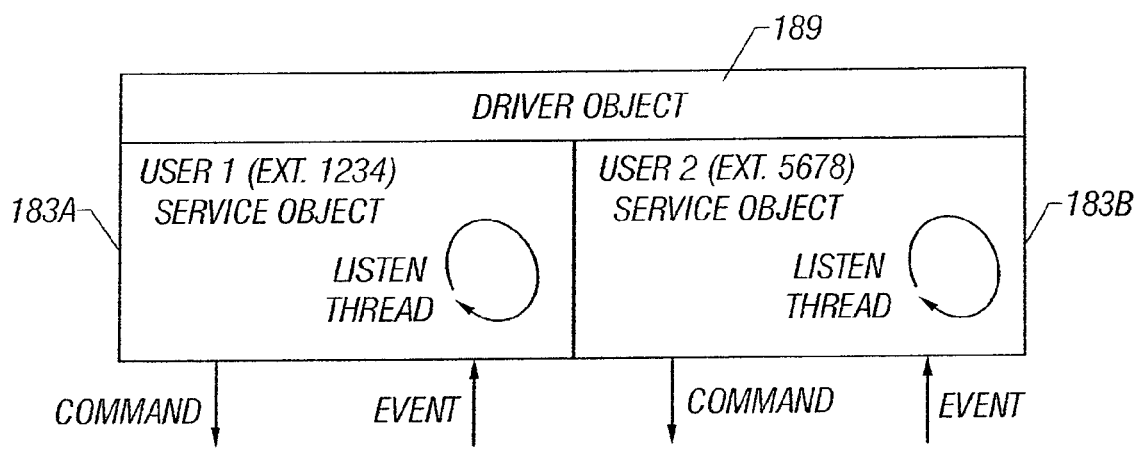
FIG. 1K is a diagram of components included in another implementation of a communication application programming interface.

Referring to FIG. 1K, if the listen thread is implemented at the domain of service objects 183, every service object 183 constructs its own listen thread and the listen thread is not shared. Each listen thread listens to a different target. For example, listen thread for user 1 listens for events on the first phone extension (ext. 1234), while the listen thread for user 1 listens for events on the second phone extension (ext. 5678).

In one embodiment, client objects 179 are a collection of function pointers implemented by communication server 109 and passed to the service objects 183 for asynchronous event notification. In one implementation, when the listen thread in channel driver 120 receives an event, the following processes occur:

1. Service object 183 invokes the HandleEvent( ) function implemented in corresponding client object 179.
2. Client object 179 queues this event to a memory cache.
3. Client object 179 interrupts or signals the server thread 174 (FIG. 1D) for Communication channel manager 177 to indicate the arrival of an event. Once this process is completed, the listen thread waits for the next event.
4. During the next cycle of server thread 174, main thread sees an event is available in the memory cache. It dequeues the event out of the memory cache and continues the processing.

Communication API Commands

Communication API 125 includes commands and data structures to allow third parties to develop applications that can integrate with client/server system 100. The data structures include arrays for passing data elements such as an agent's key value element, key value parameters, and string parameter lists.

The following provide examples of runtime status flags that can be used in communication API 125:

| | | |
|---|---|---|
| NOTSUPPORTED | = 1; | Command is not supported |
| DISABLED | = 2; | Command is disabled at this time |
| CHECKED | = 4; | Command is in "checked" state, for example when agent is in busy mode the "busy" command will be "checked" |
| BLINKING | = 8; | This is special effect flag to enable the blinking "answer call" command |
| NOPARAMSOK | = 16; | Command does not require any parameters to execute |
| STRPARAMSOK | = 32; | Command can be executed by providing single unnamed string parameters. Such commands are invoked when the agent types something in the edit control of the communication toolbar 105 and clicks the corresponding button. |

The following provide examples of commands that can be used in one embodiment of communication API 125:

MediaType: The MediaType command is used from channel driver 120 to provide the media type. An indicator of the media type, such as the following examples of media type strings, is passed to the channel driver 120 at the CreateISCDriverInstance( ) function:

| | |
|---|---|
| PHONECONTROL | = 1 |
| CALLROUTING | = 2 |
| EMAIL | = 3 |
| FAX | = 4 |
| WEBCALL | = 5 |
| WEBCHAT | = 6 |

CommandTypeEx: Channel driver 120 uses the CommandTypeEx function to request different services, such as making calls and sending messages, from communication server 109.

ObjectType: The ObjectType function is used to monitor the communication objects, which can be represented by the following parameter values:

| | |
|---|---|
| OB_LINK | = 1 |
| SWITCH | = 2 |
| QUEUE | = 3 |
| TELESET | = 4 |
| DN | = 5 |
| AGENT | = 6 |
| CALL | = 7 |
| CALLROUT | = 8 |
| EMAIL | = 9 |
| FAX | = 10 |
| WEBCALL | = 11 |
| WEBCHAT | = 12 |
| OTHERS | = 1000 |

ObjectProperty: The function ObjectProperty can be used to provide properties of monitored communication objects, such as:

| | | |
|---|---|---|
| ONOFF | = 1 | |
| AGENTID | = 2 | |
| NOTREADY | = 4 | |
| BUSY | = 5 | |
| DESCRIPTION | = 7 | |
| TIMEINQUEUE | = 9 | |
| QUEUEID | | = 12 |
| ISLOGON | | = 13 |

Channel Driver Functions

In one embodiment, driver objects 189 within each of channel drivers 120 can include the following functions:

FreeSCStrParamList is invoked by communications server 109 to release the memory which is initially allocated by channel drivers 120.

RequestMediaTypeList is invoked by communications server 109 to query the list of media type strings supported by channel drivers 120. It can include the parameter mediaTypeList, which is a list of media-type strings.

FreeSCStrParamList is invoked by communication server 109 to release memory.

RequestCommandEventList is invoked to generate lists of commands and events that are implemented for a particular media type supported by the channel drivers 120. The parameters can include an input parameter specifying the media type, and output parameters that include lists of the commands and events.

CreateISCDriverInstance is invoked to create a channel driver 120. The following parameters can be used:
  mediaTypeStr: the media-string that is defined by a particular driver implementation.
  languageCode: the language string, e.g. "ENU" for English, "FRA" for French, "DEU" for German, "PTB" for Portuguese-Brazilian, "ESN" for Spanish, "ITA" for Italian, and "JPN" for Japanese.
  connectString: the connect string for the channel driver 120
  datasetParams: the parameter list collected from the configuration
  handle: the handle to channel driver 120 returned by the channel driver 120

RequestService requests service object 183 from the channel driver 120. The following parameters can be used:
  clntInterface: the interface at the client object 179
  connectString: the connect string for the service object 183
  datasetParams: the parameter list collected based on the configuration
  serviceHandle: the handle to the service object 183 returned by the driver 120

ReleaseISCDriverInstance is invoked by communication server 109 to release the driver object 189 specified by the driver handle supplied as a parameter.

Service Object Functions

In one embodiment, service objects 183 within each of channel drivers 120 can include the following functions:

ReleaseISCServiceInstance is invoked to release the service object's handle.

NotifyEventHandlingFinished is invoked by communications server 109 to notify the driver object 189 that the event handling is complete and the driver object 189 can move on or continue the process. This function is invoked to respond to HandleEvent's notifyWhenDone parameter. The following parameters can be used:
  Handle: identifier of the service object 183.

trackingID: an identifier for the work item for which the communications server 109 was doing event handling.

result: the result of event handling query of the list of media type strings supported by the channel driver 120.

InvokeCommand is invoked by communications server 109 to invoke a driver command. The following parameter list can be used:

Handle: identifier of the service object clntCmdTrackID: the unique ID for the InvokeCommand request name: the command name to invoke stringParam: the string from "Phone #" edit box on the toolbar 105 datasetParam: the parameter list collected based on the configuration

InvokeCommandEx is invoked by communications server 109 to invoke a certain type of command. The following parameter list can be used:

Handle: identifier of the service object.

clntCmdTrackID: the unique ID decided by the communications server 109 for this InvokeCommand request.

commandType: the type of command the communications server 109 wants to execute.

datasetParam: the predefined parameter list set by the communications server 109.

ReleaseWorkItem is invoked by communication server 109 to request release of a work item. Parameters can include:

Handle: identifier of the service object.

TrackingID: identifier of the work item.

SuspendWorkItem is invoked by communication server 109 to request the service object 183 to suspend a work item. Parameters can include:

Handle: identifier of the service object 183.

TrackingID: identifier of the work item.

ResumeWorkItem is invoked by communication server 109 to request the service object 183 to resume a work item. Parameters can include:

Handle: identifier of the service object 183.

TrackingID: identifier of the work item.

HandleQueuedEvent is invoked by communication server 109 to pass an event previously queued in UQ system 102 to the service object 183 for handling. The channel driver 120 can treat this as an incoming media event from the middleware server. Parameters can include:

Handle: identifier of the service object.

name: the event name (from the original HandleEvent( ) call).

fields: the event attributes list (from the original HandleEvent( ) call).

trackingID: the unique ID for the media item.

CancelQueuedEvent is invoked by communication server 109 to notify the channel driver 120 that a media-event is cancelled, released, or transferred by UQ system 102. This function is the companion function of HandleQueuedEvent( ). The following parameters can be used:

Handle: identifier of the service object.

name: the event name (from the original HandleEvent( ) call).

trackingID: the unique ID for the media item.

Client Object Functions

The following are examples of functions that can be included in Client Objects 179. The interface to these functions can be implemented with a function pointer so that driver objects 189 do not need to link to any libraries in communication server 109.

ReleaseClientInstance causes driver object 189 to release a client object's handle.

BeginBatch and Endbatch are designed to save network overhead. The client object functions called between BeginBatch and EndBatch can be cached and sent out at the EndBatch call. These two functions can be used at the discretion of the driver object 189. For example,

```
BeginBatch_Helper(clientInterface);
        CacheCommandInformation_Helper(clientInterface, ...);
        <-- cached
;   ; ; ; // some processing
if (error)
        HandleError_Helper(clientInterface, ...); <-- cached
HandleEvent_Helper(clientInterface, ...); <-- cached
EndBatch_Helper(clientInterface); <-- All requests will be
        sent out in one request
*/
```

HandleEvent is used to handle the named event received from the channel driver 120, using the given fields. By calling this method, the channel driver 120 notifies the client objects 179 of the event, such as a call coming in on the monitored teleset. The following is the parameter list:

Handle: identifier of the service object 183.

name: the event name.

fields: event attributes list.

notifyWhenDone: When set to TRUE, client objects 179 will invoke notifyEventHandlingFinished( ) to notify the driver 120 as soon as the event handling is done.

trackingID: the ID uniquely identifies the work item that this event is associated with, e.g. call ID, email ID or web-chat session ID.

ShowStatusText displays textual status information in the status line of the client objects 179. The following parameter list can be used:

Handle: identifier of the service object 183.

text: the text to display at the client status bar.

HandleError handles asynchronous errors and logs them to an error log file. The following parameters can be used:

Handle: identifier of the service object 183.

clntCmdTrackID: if not 0, it is the same "clntCmdTrackID" value passed to InvokeCommand( ) to reflect the error caused by the request in InvokeCommand( ). If it is 0, the error occurs out of context.

error: the error text.

CacheCommandInformation is used to notify the client objects 179 about command status caching. The following parameters can be used:

commandNames: list of command names.

commandDescriptions: list of description text for each command.

commandStatuses: list of status (CommandFlag) for each command.

UpdateObjectInformation is used to notify the client objects 179 about status change of objects. The following parameters can be used:

trackingID: the ID uniquely identify the call that causes this information update.

objectType: enumerated ObjectType value.

objectID: the unique ID for this object. For phone, it is the extension. For email, it is the mailbox. For fax, it is the fax number.

datasetInfo: the list of ObjectProperty values to update. For example, the list {{"4", "TRUE"}, {"9", "33"}} indicates ISNOTREADY is TRUE and TIMEIN-QUEUE is 33 seconds.

IndicateNewWorkItem notifies client objects 179 about the arrival of new inbound work item (e.g. call, email or fax) if the driver or the middleware supports a facility to change the work item's ID. The following parameters can be used:

trackingID: the unique ID to identify the new work item.
oldTrackingID: ID to identify the old ID.

WorkItemStarted notifies client objects 179 that the agent has started working on one particular work item. This happens when (1) the agent answers a call and the call is connected, or (2) the agent accepts an email/fax work item. In response, client object 179 sets the work item identified by "trackingID" as the active work item and starts tracking this work item. The agent will be treated as talking or working. The start time of this work item can be recorded by client objects 179. The following parameters can be used:

trackingID: the unique ID to identify this work item.
oldTrackingID: See the comment of the function IndicateNewWorkItem( ).
objectType: the object type.
objectID: the media object for this work item. For phone, it is the extension. For email, it is the mail box.
  description: the description of work item. Driver implementation can use UpdateObjectInformation to change the description of work item.
  startTime: the time the work item is started.

WorkItemReleased is used to notify client objects 179 that a particular work item is released. This happens when (1) the agent releases a call and the call is disconnected, or (2) the agent completes an email/fax work item. In response, client objects 179 stop tracking this work item and remove this work item. The following parameters can be used:

trackingID: the unique ID to identify the work item that is being released.
stopTime: the time the work item is released/stopped.

CleanAllWorkItems notifies client objects 179 that all work items stored in client objects 179 should be removed.

WorkItemSuspended notifies client objects 179 that a work item is suspended. This can happen, for example, when (1) the agent puts a call to hold, or (2) the agent suspends an email/fax work item. The driver implementation calls this function when suspension is done. In response, client objects 179 save the working context for this particular work item. The parameter trackingID can be used to identify the work item WorkItemResumed notifies client objects 179 that a suspended work item is resumed. This can happen, for example, when (1) the agent unholds a call and the call is retrieved, or (2) the agent resumes an email/fax work item. The driver objects 189 call this function when restoring is complete. In response, client objects 179 restore the working context(screen+work-tracking obj) and set the active work item as the one identified by "trackingID". The parameter trackingID can be used to identify the work item.

Note that other functions and parameters can be included in communication API 125 instead of, or in addition to, the functions listed herein.

Universal Queuing System

UQ system 102 queues requests for all types of media until an agent is assigned to the request. As agents become available, either by an agent logging in, finishing a task, or due to a change in state or assignment, UQ system 102 pushes a work item from a communication channel to an agent, and removes the work item from the respective queue. In one implementation, when multiple work items are routed to an agent, the work item that arrived first is presented to the agent and the other work item is returned to its respective queue and rerouted/pushed to the next available agent that is capable of handling the particular work item.

UQ system 102 includes UQ receiver 302 and UQ requester 304 that interface with UQ engine 306 via UQ server 308. An enterprise application integration (EAI) server 146 can be included in system 100 to receive messages from UQ system 102. In one embodiment, web server 146 receives the message and sends it to EAI object manager 190. EAI object manager 190 packages the messages and transmits it to UQ business service 106. In other embodiments that do not include EAI object manager 190, the message can be sent directly to UQ business service 106.

UQ Business Service

UQ system 102 interfaces with UQ business service 106 and web server 146 via UQ application programming interface (UQ API) 314. UQ business service 106 places information received from UQ system 102 into data structures used by communication server 109. UQ business service 106 also places information from communication server 109 into data structures, commands, and parameters recognized and used by UQ API 314.

In one embodiment, UQ business service 106 includes the following functions, with input and output parameters shown in parentheses, for initializing and communicating with the UQ system 102:

UQOpenConnection (UQConfigurationName, Return)
  Provides UQ business service 106 with the necessary UQ configuration parameters to receive messages from communication server 109. The parameter "Return" in all of the UQ business service functions indicates status of the function upon return, for example, "0" means execution was successful.

UQAssign (Return)
  Provides the UQ business service 106 with the necessary UQ configuration parameters to communicate with the communication server 109.

UQInitRules(Return)
  When UQOpenConnection is called, UQ business service 106 determines whether to upload rules, such as agent rules, and work item escalation rules. This function is called during the start-up of communication server 109. If the rules are to be sent, this function retrieves route rules and escalation rules from a data table and packages them for transmission to UQ system 102. Once rules are downloaded to UQ system 102, the UQReplaceRules function is called to modify the rules.

UQReplaceRules(Return)
  This function is called when the UQ rules need to be updated, such as when changes are made to a set of agent or escalation rules while communication server 109 is in operation.

UQ Disconnect (Return)
   Commands UQ system 102 to terminate the connection between UQ system 102 and web server 146, and between UQ system 102 and communication server 109. This function is called when UQ system 102 services are no longer needed.

In one embodiment, UQ business service 106 also includes the following functions for initializing and maintaining agents:

AgentLogon (AgentLogin, Return, AgentState)
   This function allows an agent to log into UQ system 102. Once the login is successful, agent is ready to receive work items. The AgentLogin parameter is the agent identification number assigned in communication server 109. The AgentState parameter is set to a value indicating the agent's state after the function is executed.

AgentLogout (AgentLogin, Return, AgentState)
   This function allows an agent to log out of UQ system 102. Once the logout is successful, UQ system 102 will not queue any more work items for this agent.

AgentInitAuxwork(AgentLogin, Output)
   This function requests UQ system 102 to place the agent in AuxWork mode after all the current work items are completed. In AuxWork mode, agent will not receive more work but will remain logged in to the UQ system 102.

AgentAvailable(AgentLogin, Return, AgentState)
   This function requests UQ system 102 to place the agent into available status. In the available state, the agent is ready to receive work items.

RequestAgentMediaMode (AgentLogin, MediaType, Return, AgentMediaMode)
   This function allows clients 104 to request the agent state.

ChangeAgentMediaMode (AgentLogic, Return, AgentMediaMode)
   This function allows clients 104 to change the media mode for an agent.

ChangeAgentSkil (AgentLogin,Return)
   This function allows clients 104 to update the skill of an agent. After an agent's skill has been changed, this function should then be used to update UQ system 102 with the new agent skill.

RequestAgentState (AgentLogin, Return, AgentState)
   To request UQ system 102 to report the current agent state.

RequestAgentWorkItemList (AgentLogin, Return, WorkItemID, MediaType, IsScheduledTask, ScheduleStartTime, ScheduleEndTime, AgentID, WorkItemState, WorkItemDataProperty)
   Request the UQ system 102 to return a list of all work items currently being handled by an agent.

RequestAgentWorkableList (AgentLogin, Return, WorkItemID, MediaType, IsScheduledTask, ScheduleStartTime, ScheduleEndTime, AgentID, WorkItemState, WorkItemDataProperty)
   This function requests UQ system 102 to return a list of possible work items for the agent. This function is used when the agent wants to pick a particular work item rather than being assigned to work items by UQ system 102.

RequestWorkItemAssignment (AgentLogin, WorkItemID, Return)
   This function requests UQ system 102 to dispatch the specific work item to the agent if possible. If the work item is still available, the Return parameter code indicates SUCCESS and the work item will be delivered through communication server 109.

RequestAgentMediaState (AgentLogin, Return, MediaType, AgentState, NumWorkItems)
   This function requests UQ system 102 to report the media (channel state) for each media that the agent is capable of handling.

In one embodiment, UQ business service 106 also includes the following functions for initializing and maintaining work items:

AddWorkItem (WorkItemID, MediaType, IsScheduledTask, ScheduleStartTime, ScheduleEndTime, WorkItemDataProperty, Return)
   This function requests UQ system 102 to add the specific work item into the UQ system 102 for future dispatch.

RequestWorkItemState (WorkItemID, Return, WorkItemState)
   This function requests the current state of a work item.

AcceptWorkItem (WorkItemID, Return)
   This function allows clients 104 to tell UQ system 102 that the assigned work item has been accepted. As a result, agent state and work item state are updated by UQ system 102 to reflect the acceptance of the work item.

RejectWorkItem (WorkItemID, AgentLogin, Reason, Return)
   This function allows clients 104 to tell UQ system 102 that the assigned work item has been rejected. As a result, the work item will be sent back to the queue and the agent state for the channel will be set to AuxWork.

CompleteWorkItem (AgentLogin, WorkItemID, Return)
   This function informs UQ system 102 that the work item is completed. The next state for the agent will depend on the Auto-Wrap setting, which can be set via a user interface such as toolbar 105. If Auto-Wrap is True, the agent is in Wrap mode and the work item will be in wrap mode. If Auto-Wrap is FALSE, the agent is placed back in the Available state.

HoldWorkItem (AgentLogin, WorkItemID, Return, WorkItemState, NewAgentState).
   This function requests UQ system 102 to put a work item on hold status.

UnHoldWorkItem (AgentLogin, WorkItemID, Return, WorkItemState, NewAgentState).
   This function requests UQ system 102 to take a work item off hold status.

BlindTransferWorkItemToAgent (AgentLogin, WorkItemID, Return)
   This function transfers a work item to another agent. If the agent is not available, the work item can be queued for the agent.

TransferWorkItemToAgent (AgentLogin, WorkItemID, Return)
   This function tells UQ system 102 to transfer the work item to the agent. If the agent is not available, UQ system 102 can inform the requesting agent that the work item is not deliverable.

TransferWorkItemToRoute (AgentLogin, RouteID, Return)
   This function transfers an agent to a route defined in the system 100 (FIG. 1A). A route represents a specific way to process the work item. Transferring a work item to a route redefines the characteristics of the work item and the way the work item should be handled. For example, the work item was first believed to be best handled by agents with knowledge in one area and now find that it should be handled by an agent having knowledge in another area. Therefore, this work item is transferred to a route that can handle the work item.

In one embodiment, UQ business service 106 includes the following functions for reporting performance statistics:

SetChannelStatInterval (Interval,Return)
    This function is used to set the feeding interval of the channel real time statistics. A predetermined default, such as 60 seconds, can be used. Statistics are transmitted to UQ business service 106 and logged into a table.

StartAgentStat (Interval,Return)
    This function is used to initiate the transmission of agent statistics. Data is logged to an agent statistics table.

StopAgentStat (AgentLogin,Return)
    This function is used to stop the transmission of agent statistics.

In one embodiment, UQ business service 106 includes the following functions for handling work items:

HandleWorkItem (AgentLogin, WorkItemID, MediaType, IsScheduleTask, ScheduleStartTime, ScheduleEndTime, AgentLogin, WorkItemState, DataProperty, MediaType, IsScheduleTask, ScheduleStartTime, ScheduleEndTime, AgentLogin, WorkItemState, DataProperty, Return)
    This function is used to inform a client that a work item is being assigned to an agent.

HandleWorkItemStatus (WorkItemID, MediaType, IsScheduleTask, ScheduleStartTime, ScheduleEndTime, AgentLogin, WorkItemState, DataProperty, Return)
    This function is used to inform clients 104 that the status for the work item has been changed, so clients 104 can take any action that is necessary as a result. For example, work item status could be changed from alerting to complete because the other party abandoned the work item. In this case, clients 104 may have some housekeeping to perform.

HandleAgentStateChange (AgentLogin, AgentState, Return)
    This function is used to inform UQ client that the state of the agent has been changed.

HandleRouteStatisticsRequest (RouteStat, TotalWorkItems, AverageWaitTime, AverageServeTime, NlongestWaitTime, OperationMode, Return)
    This function is used to inform clients 104 of the arrival of route statistics information. This method will handle the incoming statistics information, for example, by writing it to a database.

HandleAgentStatisticsRequest (AgentLogin, TotalWorkItems, AverageServeTime, AverageWrapTime, TotalAuxTime, TotalServingTime, TotalLoginTime, TotalServedWorkItem, Return)
    This function is used to inform the UQ client of the arrival of agent statistics information. This method will handle the incoming statistics information. Very likely the information will be written to a database.

HandleError (MessageCode, Return)
    This function is used to inform UQ client that an error is received.

HandleAlarm (MessageCode,Return)
    This function is used to inform UQ client that an alarm is received.

HandleJournal (WorkItemID, WorkItemDataProperty, AgentStateHist, AgentLogin, AgentState, StartTime, EndTime, UQReasonCode, AgentReasonCode, EscHist, SzStep, StartTime, EndTime, UQReasonCode, AgentReasonCode, Return)
    Journal of a work item to be sent to UQ client when the work item is completed. UQ client will log the journal into database.

The foregoing lists are examples of functions that can be included in UQ business service 106. Other functions can be included in addition to, or instead of, these examples. Some of the functions include return codes and/or state codes to indicate whether a requested function was performed successfully and/or the state of UQ system 102, a work item, or an agent. The following lists provide examples of codes that are used as parameters in the preceding functions:

| Return Code | |
|---|---|
| 0 | Success |
| 1 | Success_More_Status |
| 2 | Error_Uq_Initialized |
| 3 | Error_Uq_Not_Initialized |
| 4 | Error_Failed |
| 5 | Error_System_Wrong_Api |
| 6 | Error_System_Initialization_Failed |
| 7 | Error_Agent_Setting_Invalid_State |
| 8 | Error_Agent_Undefined |
| 9 | Error_Agent_Unable_To_Change_Skill |
| 10 | Error_Queue_Not_Initialized |
| 11 | Error_Queue_Undefined |
| 12 | Error_Queue_Capacity_Exceeded |
| 13 | Error_Workitem_Adding_Failed |
| 14 | Error_Workitem_Failed_Change_State |
| 15 | Error_Unknown_Media |

| Agent State | |
|---|---|
| 1 | Available |
| 2 | Logout |
| 3 | Busy |
| 4 | AuxWork |
| 5 | InitAuxWork |

| Media Mode | |
|---|---|
| 1 | Available |
| 2 | Unavailable |
| 3 | Busy |
| 4 | Wrap_Up |

| Operation Reason Code | |
|---|---|
| 1 | Setting_Invalid_State |
| 2 | Agent_Not_Available |
| 3 | Route_Undefined |

| Work Item State | |
|---|---|
| 1 | Active |
| 2 | Wrap_Up |
| 3 | Alerting |
| 4 | Completed |
| 5 | Queued |
| 6 | Scheduled |
| 7 | On_Hold |
| 8 | Received |

UQ Configuration

Referring to FIGS. 1A-E and 3, clients 104 choose a UQ configuration via the UQOpenConnection function in UQ business service 106. UQ system 102 uses information such as "UQ receiver server name" and "UQ receiver Port" to determine where to send responses. In one embodiment, multiple receiver servers (not shown) in EAI object manager 190 can be connected to receive messages from UQ system 102, and, therefore, each receiver communicating with UQ system 102 sends a UQ configuration parameter in the UQOpenConnection function.

Table 1 shows an example of parameters in a UQ configuration table that is stored in UQ system 102 and used to establish communication with and perform functions as requested by communication server 109 via the UQOpenConnection function. For example, Table 1 includes parameters for identifying and establishing communication with the host for UQ system 102. Table 1 also includes default settings for agent preferences such as whether an agent is in the auto-ready state after login or in the auto-auxwork state after login.

Table 2 shows a subset of parameters in the UQ Configuration table in Table 1 referred to as PropertyInfo parameters that are used in other functions that are included in UQ business service 106.

TABLE 2

Property Information Parameters

| Name | Purpose |
| --- | --- |
| UQ Host Name | |
| UQ Host Port | |
| HTTPURLTemplate | Template to be used in HTTP URL for login and making requests |
| HTTPLoginURLTemplate | Template to be use in HTTP for login |
| HTTPLogoutURLTemplate | String that needs to be included in the logout process |
| MaxConnections | Number of connections that need to be opened |

TABLE 1

UQ Configuration Table

Configuration Name

| | |
| --- | --- |
| UQ Host Name | Identifier for host for UQ system 102 |
| UQ Host Port | Address of host |
| HTTPURLTemplate | Name of primary receiver server |
| HTTPLoginURLTemplate | |
| HTTPLogoutURLTemplate | |
| Business Service | Specify the name of UQ business service 106 that will be invoked when outbound XML is sent. |
| Method | The name of method to be invoked in the UQ business service 106 mentioned above. |
| MaxConnection | Maximum number of connections to be opened on the primary receiver server. UQ system 102 has the option to send events to any of those open connections. By opening up multiple connections, multiple requests can then be processed. |
| Transport | Web server 146 and EAI object manager 190 require: Name of server for UQ system 102 Listening Port for UQ system 102 Workflow process 144 requires: Name of server for UQ system 102 Listening Port for UQ system 102 Sender WorkFlow Name Send Method Name |
| SecondaryHTTPURLTemplate | For secondary UQ receiver server (optional). If included, this receiver server is used for primarily for non-time critical message such as alarm, error, statistics and journal. If no secondary receiver server is included, the primary receiver server in EAI object manager 190 can be used. |
| SecondaryHTTPLogoutURLTemplate | Template for logout information |
| SecondaryHTTPLoginURLTemplate | Template for login information |
| SkillBC:<Business Component Name> | A Skill map that contains a list of skills and associated skill items for a client. Includes a list of business skills. For example, SkillBO:Industry = Industry SkillBO:Internal Product = Internal Product SkillBO:Language Def = Language Def SkillBO:Product Line = Product Line Briefing |
| AuxWorkAfterLogin | If "true", place the agent to Aux mode after login. Default is "true" |
| LogoutFromAvailable | If "true", allow agent to logout at Available state. Default is "true" |
| WrapEnabled | If "true", wrap state is valid for agent. Default is "true" |
| Load Balancing | If "true", Server Load Balancing is used and installed. Default is "false" |

TABLE 2-continued

Property Information Parameters

| Name | Purpose |
| --- | --- |
| Secondary Receiver Host | |
| Secondary Receiver Port | |
| SecondaryHTTPURLTemplate | |
| SecondaryHTTPLogoutURLTemplate | String that needs to be included in the logout process |

Web server 146 314 handles packing information using a suitable data transfer protocol for outgoing messages to EAI object manager 190. In one implementation, for example, HTTP is used to communicate messages to and from UQ API 314. Web server 146 converts information in HTTP format to another suitable transport protocol which EAI object manager 190 unpacks for use by UQ business service 106. In other embodiments, other protocols known in the art can be used instead of, or in addition to, HTTP.

UQ Routing

UQ engine 306 defines a route for processing each work item. For example, if a work item is a fax requiring response from an agent with knowledge of computer networking, the UQ engine 306 would define a route that specifies an agent with computer networking skills. An agent can transfer the work item to a route queue using the functions TransferWorkItemToRoute(Route configuration Name) or BlindTransferWorkItemToAgent(agentID) if the agent is not able to respond to the work item. The skill requirements for the work item can be changed before invoking the transfer if the agent determines that a different skill is necessary to respond to the work item.

In one embodiment, route points are generated, wherein each route point has specific skill requirements. When a work item is to be transferred to another point, the transferring agent can choose a route point from a pop up list, for example. The list can include the option to either list all agents or all route points.

UQ System Scenarios

The following examples show how requests from clients are processed through one embodiment of system 100:

Initialization and Rules Download

Communication server background mode server 170 uses UQOpenConnection function in UQ business service 106 to connect clients with UQ system 102. In one embodiment, two or more configurations can be available to initialize UQ business service 106, including a default configuration. The default UQ configuration parameters are used if no other configuration specified. The UQPropertyInfo parameters of UQOpenConnection included PrimaryReceiverName and PrimaryReceiverPort which identify the location of the primary receiver server in EAI server 146.

UQOpenConnection can be invoked multiple times to connect multiple receiver servers in EAI server 146 to UQ system 102, and UQ system 102 maintains a list of all connections to the connected receiver servers. After a successful UQOpenConnection, the function UQInitRules can be invoked to download agent skill information, as well as rules for escalating agents and specifying routes. In one embodiment, UQInitRules is invoked only once during initialization, and the function UQReplaceRules is used to update the rules once they have been initialized. The parameter ERROR_UQ_INITIALIZED indicates an error if UQInitRules if subsequently invoked. An indicator of whether the initialization was successful is supplied in the Return parameter associated with the UQInitRules function.

Agent Logon

New agents invoke UQOpenConnection through business service 106 to inform UQ system 102 that there is a new agent. The function AgentLogon is then invoked by UQ business service 106 to log the agent into UQ system 102. UQ business service 106 then sends a message that includes the agent skill information to UQ system 102.

If multiple receiver servers are connected, each invocation of the function AgentLogon includes information about the receiver server that the agent is associated with. Agent information also includes information including auto-available setting and auto-wrap setting. UQ system 102 returns either the error if the invocation to AgentLogon fails, or returns the new agent state if the logon operation was successful.

Email Arrival

When communication server 109 receives an email message, it sends the message along with related information regarding the client who sent the message to UQ business service 106. UQ business service 106 transfers the email message and related information to UQ system 102 via the AddWorkItem function. UQ system 102 determines whether to accept the work item and issues a response to communication server 109 via web server 146, EAI server 146, and UQ business service 106 indicating whether the work item was accepted using the status parameter in the HandleWorkItem function.

UQ Delivers Work Item

UQ system 102 determines an agent for a work item and sends a message that the work item was assigned to an agent to communication server 109 via the receiver server associated with the agent. UQ system 102 then transmits a message via the HandleWorkItem function to the receiver server associated with the agent. The ProcessEvents function in UQ business service 106 is then invoked to dispatch the message to an agent. The agent invokes the WorkItemAccept function to inform UQ system 102 that it received the work item.

UQ System Issues an Alarm or Error

As an example of one method for UQ system 102 to notify communication server 109 of an error or alarm, assume UQ system 102 determines that the number of requests that can be handled by one of the communication channels has exceeded a predefined threshold. UQ system 102 sends a return code to the receiver server via the HandleError function indicating that the queue capacity has been exceeded. EAI server 146 receives the message and invokes the function "ProcessEvents" in UQ business service 106. The error message can be logged and broadcast to the component that issued the request. Alarm messages are handled in a similar manner. The error/alarm can be broadcast visually, aurally, textually, and/or by any other suitable means known in the art.

UQ System Sends Statistics to Communication Server

A client or other component in system 100 (FIG. 1A) can request statistics regarding its communication channels, agents, and/or the routing of agents, from UQ system 102 via SetChannelStatInterval, StartAgentStat, and StopAgentStat functions. UQ system 102 generates the requested statistics and transmits them to Web server 146. When the receiver server in EAI object manager 190 receives the message, it can log the statistics and broadcast them through an interface such as a message bar mechanism, as known in the art. Agent configurations can be set up to request statistics on a continual basis. The statistics can include information for work items completed as well as work items in the agent's queue.

Agent Accepts a Work Item

When an agent is in AuxWork mode, the agent can choose a work item from the queue through a user interface such as the toolbar 105. When a work item is selected, UQ system 102 is notified via the RequestWorkableItemList function in business service 106. If the work item is available, the function will indicate a successful selection through the return parameter and the work item is delivered via the HandleWorkItem function. The RequestWorkableItemList function can return an error indicator if the work item is not available for the agent.

Call Routing

When UQ system 102 receives a route request, UQ system 102 determines the agent to assign to the work item and sends a message to the agent's receiver server in EAI object manager 190 that includes the assigned agent and the work item. If UQ system 102 cannot find an agent to assign within the time allowed, the request is placed in a waiting queue as implemented by UQ engine 306. It is important to note that many different types of commercially available queuing engines 306 can be used in UQ system 102.

Automated Call Distribution (ACD) Interaction with the UQ System

Referring to FIGS. 1A-D and 3, an agent can be connected to receive calls directly from ACD switch 130E, without interacting with UQ system 102. Agents can also be connected to receive calls from ACD switch 130E as well as other work items through UQ system 102. This type of configuration is referred to auxiliary work mode (AuxWork mode). An agent can place themselves in the AuxWork state through an interface such as toolbar 105, or an administrator may configure the agent to enter the AuxWork state.

In one implementation of AuxWork mode, ACD switch 130E dispatches a call to an agent, and the agent informs session mode communication server 110 when it answers the call. Session mode communication server 110 then relays the notice to UQ system 102. At this point, UQ system 102 asks session mode communication server 110 to place the agent in the AuxWork state using, for example, the AgentInitAuxwork function as described herein, after the agent finishes the call.

When the agent finishes the call, it informs session mode communication server 110 that the call is done, and the session mode communication server 110 in turn informs UQ system 102 that the call is finished. UQ system 102 then determines whether there is a suitable work item to assign to the agent based on the media channels in the agent's configuration. If a work item is available, the work item will be sent to the agent through the agent's receiver server in EAI object manager 190. The agent informs UQ system 102 when it finishes the work item. If UQ system 102 determines that there are no more work items for the agent, it informs session mode communication server 110 to set the agent's ACD mode to ready to continue receiving calls through ACD switch 130E.

There are several alternative implementations that can be used to place an agent in the AuxWork state. For example, an agent can default to AuxWork state. UQ system 102 can be notified when ACD switch 130E receives a call that should be handled by the agent, and the agent notified to suspend processing a work item, such as a response to an email request, to take the call. The agent notifies UQ system 102 when the call is completed, and returns to processing the suspended work item.

Agent State Change

When a work item is dispatched to an agent, the agent invokes the AcceptWorkItem function to accept the work item. Output parameters in AcceptWorkItem inform UQ system 102 of the new agent state and work item state. When the agent completes the work item, it invokes the CompleteWorkItem function to inform UQ system 102 of the new agent state and work item state.

An auto-wrap option can be set in the agent's configuration table that allows an agent time to wrap up a work item upon completion. Agents can select an interface option that invokes the AgentAvailable function to indicate that they are out of wrap up mode and ready to accept another work item. UQ system 102 changes the status of the work item to Complete and places the agent in the Auxwork state if AgentInitAuxWork function has been invoked. If the AgentInitAuxWork function is not invoked, the agent's state is set to BUSY if there are other work items in the queue that the agent can handle. Otherwise the agent is placed in the Available state.

Work Item Cancelled

A situation can arise when a work item is cancelled after it has been assigned to an agent, but before the agent has accepted the work item. Such a situation may arise, for example, when a caller hangs up while waiting. In this case, the UQ system 102 informs the client that the work item is cancelled through HandleWorkItemStatus and a signal, such as a blinking button on the agent's user interface display, can be changed to indicate that the work item was removed.

PBX and Email with PBX Higher Priority

The term private branch exchange (PBX) refers to a subscriber-owned telecommunications exchange that usually includes access to the public switched network. When an email and a PBX work item are queued, UQ system 102 uses the priority set forth in the route rules to determine which media will have higher priority over the other. Client configurations typically give PBX work items higher priority than email.

Work Item Journal

When a work item is completed, UQ system 102 sends a work item journal entry to communication server 109 via the HandleJournal function. The journal entry includes information to identify whether the journal entry pertains to the agent state history and/or the work item escalation history of the work item.

System Failure

If the connection between UQ system 102 and session mode communication server 110 fails, UQ system 102 will remove all agents associated with session mode communication server 110 and mark all work items as "Complete" with a failure error code.

Multiple Requesters and Receivers

When UQ business service 106 is instantiated, it will load the UQ configuration including the sender's server component name and the workflow name. In one embodiment, the sender server component is the EAI object manager 190, which is transparent to clients 104. If there are multiple instances of EAI object manager 190, communication server 109 routes the request to the appropriate component in communication server 109. A load balancer can be included to balance the load between multiple instances of EAI object manager 190.

Each work item sent by UQ clients include a login and a client key associated with the work item. When the same work item is being returned form UQ system 102 as a result of either an agent assignment or problem with the work item, the login and the client key are used to route the result to the right client.

Blind Transfer of a Work Item to an Agent

An agent can use the function BlindTransferWorkItemToAgent to transfer a work item to another agent if the agent cannot respond to the work item, or thinks that another agent is better qualified to respond. If the transferee agent is not available to accept the work item being transferred, the work item will be queued until the agent is available.

Consultative Transfer of a Work Item to an Agent

An agent can invoke the TransferWorkItemToAgent function to transfer a work item to another agent to consult with the other agent regarding the work item. If the agent is not available for consultation, UQ system 102 informs the agent that the other agent is not available. The agent can select whether to hold on to the work item, retry, or send the work item to a route.

Transfer Work Item to a Route

An agent can use the function TransferWorkItemToRoute to transfer a work item to along a route to another agent. This is useful, for example, when an agent receives a work item that would be handled more efficiently by an agent with other skills.

UQ API

In one embodiment, a client server system 100 (FIGS. 1A-E) in accordance with the present invention includes UQ API 314 for communicating with UQ system 102. For example, the interface can translate information in one format, such as simplified object access protocol (SOAP) used by UQ business service 106 to an extensible markup language (XML) format used in UQ system 102. UQ API 314 can also translate information between other formats suitable for use in UQ business service 106 and UQ system 102. Alternatively, the same format can be used throughout system 100, thereby eliminating the need for UQ API 314. UQ API is further described in copending U.S. patent application Ser. No. 09/823,678, entitled "Extensible Interface For Intermodule Communication", which application was filed on the same day is assigned to the same assignee as the present application and is incorporated by reference herein.

In one embodiment, a user interface for entering and editing agent skills is provided. An example of an agent skill graphical user interface (GUI) is described in U.S. patent application Ser. No. 09/823,531, entitled "Communication Toolbar Supporting Multiple Communication Channels of Different Media Types", which application was filed on the same day and is assigned to the same assignee as the present application and is incorporated by reference herein. The agent skill GUI includes fields for selecting, entering and editing agent information including name, employee number, job title, login name, contact information, skills, and the level of expertise for each skill item. After a client updates the skills of an agent through the agent skill GUI, the ChangeAgentSkill function in UQ business service 106 can be used to update agent information in UQ system 102.

UQ API Data Structures

FIGS. 4a-4m show tables representing data structures that are used in one embodiment of UQ API 314 for communicating information between UQ system 102 and communication server 109.

FIG. 4a shows Table UQ_CFG which defines UQ system 102 configuration parameters such as the UQ server name, server port, receiver name, and receiver port. FIG. 4b defines Table UQ_CFG_PARAM which includes configuration parameters for UQ system 102 such as the configuration identifier, the name of the configuration.

FIG. 4c is used for information pertaining to different routes defined for different media types, priority, and other characteristics. FIG. 4d further defines the data properties of a route. The characteristic of a route can be defined by one or more route properties. For example, an email will have "recipient", "subject" and category. A fax mail will be "DNIS" and "ANI". These characteristic can be translated into skill. For example, "Recipient"="Sales" can be translated into "Department"="Sales". Another example is "DNIS"="8000" can be translated into "Product"="NT".

FIG. 4e defines how the processing of a work item can be escalated because the work item has not been served for a pre-defined period of time. Each escalation process defines a way that a work item should be processed. In general, the escalation process is to generalize the skill requirement of a work item so that the chance of having the work item served is improved.

FIG. 4f defines the skill requirement for each escalation rule. Each rule generalizes the skill requirement of a work item.

FIG. 4g is a map between route property and skill. For example, "DNIS"="8000" could be translated into "Product"="NT". This is basically a list of possible properties for each media. For example, email has subject, CC, recipient. PBX has ANI and Language.

FIG. 4h represents the number of end points, also referred to as maximum number of sessions, for each media type that an agent is allowed.

FIGS. 4i-4k store route, media, and agent statistics information, respectively. In one embodiment, the statistics are sent from UQ system 102 to communication server 109 at pre-defined time intervals as specified in the UQ configuration passed to UQ system 102. An agent or administrator can also request statistics when desired through communication server 109. Some of the statistics, such as "Average Wait Time" are time dependent, and therefore, the time period is also included as part of the data.

FIG. 4l stores the error log.

FIGS. 4m-4p store the processing history of each work item.

Other tables can be included in an embodiment of UQ system 102 in addition to, or instead of, the tables shown in FIGS. 4a-4p.

An Exemplary Computing and Network Environment

Figure 5:
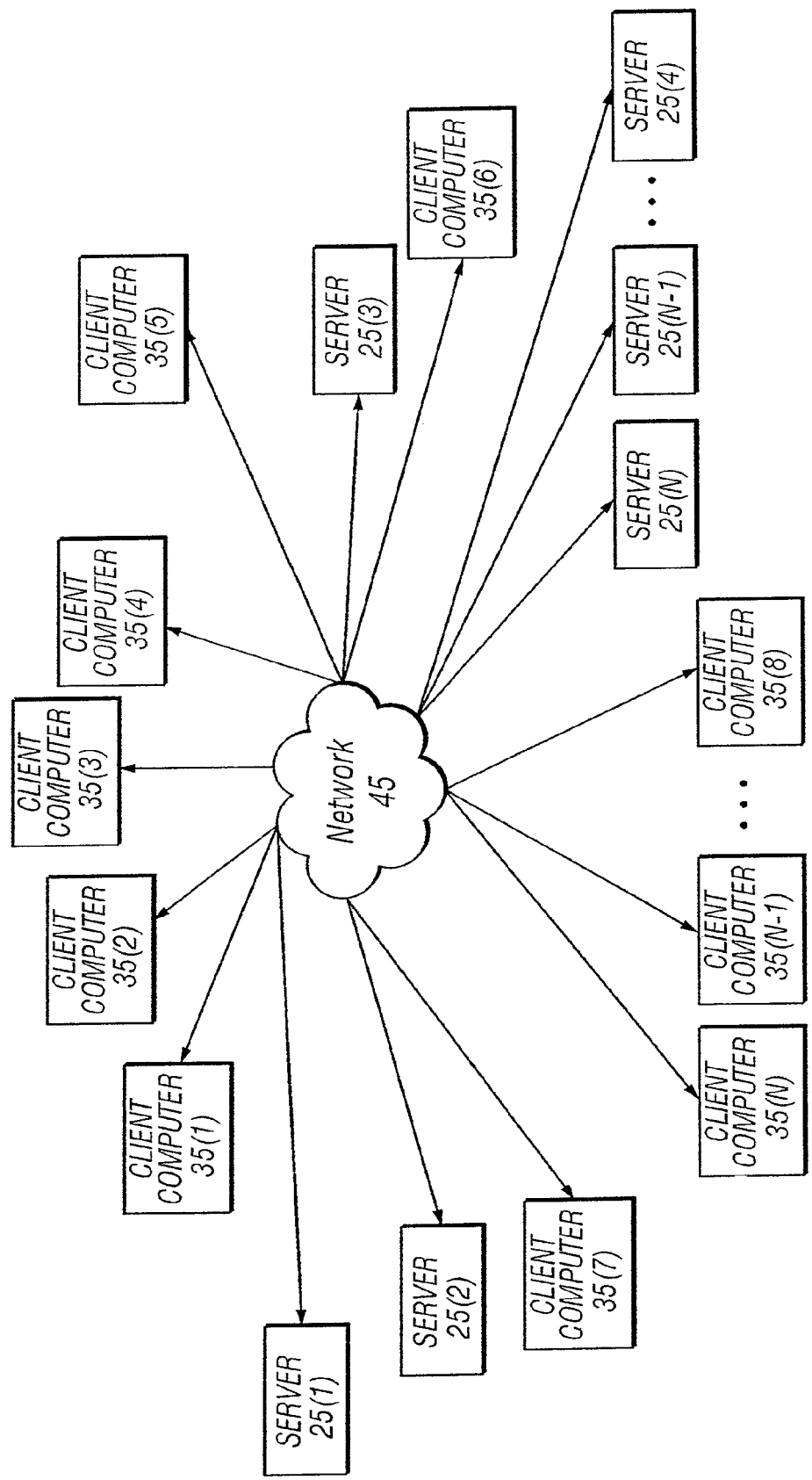
FIG. 5 is a block diagram illustrating a network environment in which a system for enabling and scheduling agents according to embodiments of the present invention may be practiced.

FIG. 5 is a block diagram illustrating a network environment in which a client/server system 100 according to the present invention may be practiced. As is illustrated in FIG. 5, network 45, such as a private wide area network (WAN) or the Internet, includes a number of networked servers 25(1)-(N) that are accessible by client computers 35(1)-(N). Communication between client computers 35(1)-(N) and servers 25(1)-(N) typically occurs over a publicly accessible network, such as a public switched telephone network (PSTN), a DSL connection, a cable modem connection or large bandwidth trunks (e.g., communications channels providing T1 or OC3 service). Client computers 35(1)-(N) access servers 25(1)-(N) through, for example, a service provider. This might be, for example, an Internet Service Provider (ISP) such as America On-Line™, Prodigy™, CompuServe™ or the like. Access is typically had by executing application specific software (e.g., network connection software and a browser) on the given one of client computers 35(1)-(N).

It will be noted that the variable identifier "N" is used in several instances in FIG. 5 to more simply designate the final element (e.g., servers 25(1)-(N) and client computers 35(1)-(N)) of a series of related or similar elements (e.g., servers and client computers). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

One or more of client computers 35(1)-(N) and/or one or more of servers 25(1)-(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e., peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system, discussed in terms of client computers 35(1)-(N) is shown in detail in FIG. 6.

Figure 6:
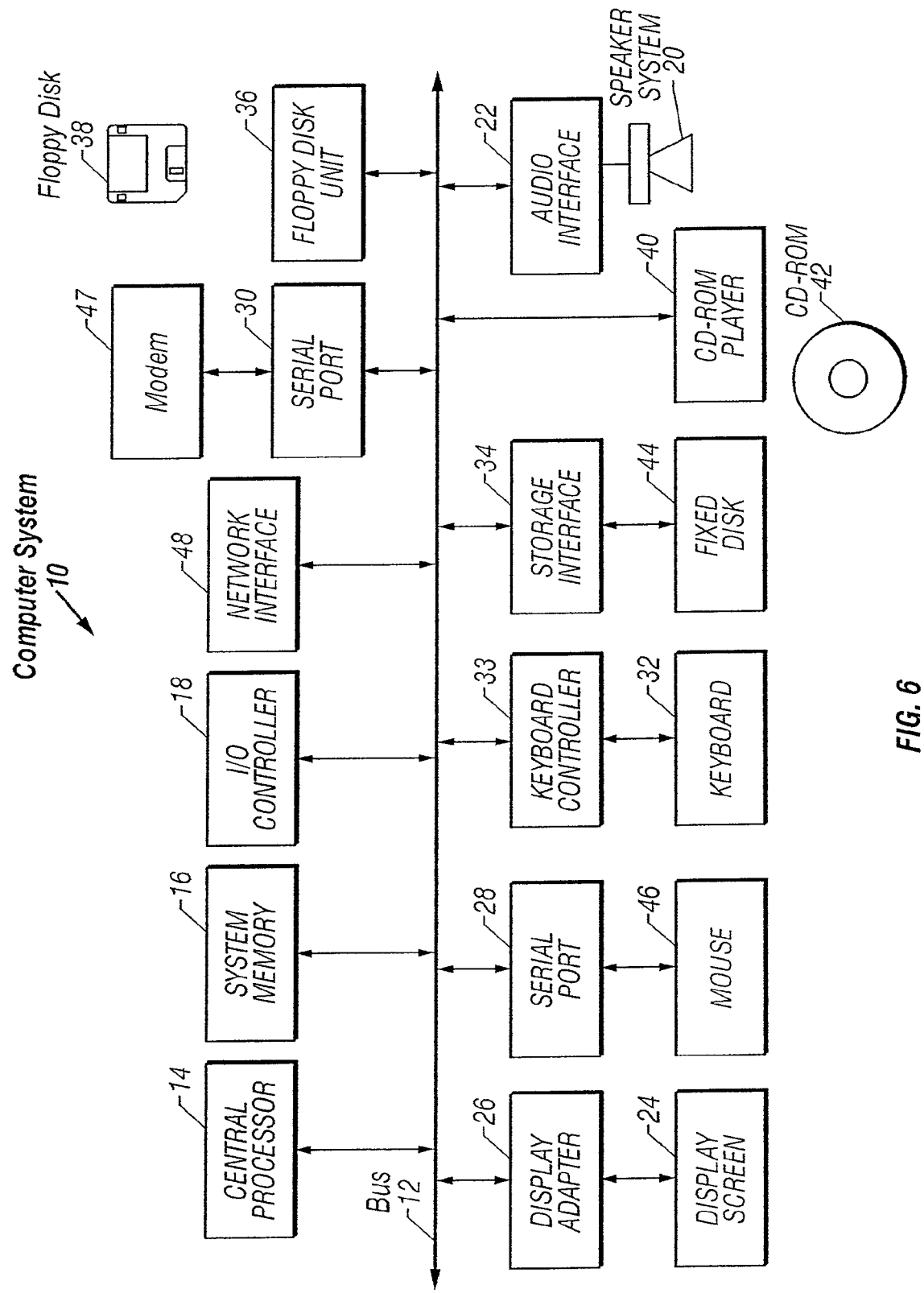
FIG. 6 is a block diagram illustrating a computer system suitable for implementing embodiments of the present invention.

FIG. 6 depicts a block diagram of a computer system 10 suitable for implementing the present invention, and example of one or more of client computers 35(1)-(N). Computer system 10 includes a bus 12 which interconnects major subsystems of computer system 10 such as a central processor 14, a system memory 16 (typically RAM, but which may also include ROM, flash RAM, or the like), an input/output controller 18, an external audio device such as a speaker system 20 via an audio output interface 22, an external device such as a display screen 24 via display adapter 26, serial ports 28 and 30, a keyboard 32 (interfaced with a keyboard controller 33), a storage interface 34, a floppy disk drive 36 operative to receive a floppy disk 38, and a CD-ROM drive 40 operative to receive a CD-ROM 42. Also included are a mouse 46 (or other point-and-click device, coupled to bus 12 via serial port 28), a modem 47 (coupled to bus 12 via serial port 30) and a network interface 48 (coupled directly to bus 12).

Bus 12 allows data communication between central processor 14 and system memory 16, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 10 are generally stored on and accessed via a computer readable medium, such as a hard disk drive (e.g., fixed disk 44), an optical drive (e.g., CD-ROM drive 40), floppy disk unit 36 or other storage medium. Additionally, applications may be in the form of electronic signals modulated in accordance with the application and data communication technology when accessed via network modem 47 or interface 48.

Storage interface 34, as with the other storage interfaces of computer system 10, may connect to a standard computer readable medium for storage and/or retrieval of information, such as a fixed disk drive 44. Fixed disk drive 44 may be a part of computer system 10 or may be separate and accessed through other interface systems. Many other devices can be connected such as a mouse 46 connected to bus 12 via serial port 28, a modem 47 connected to bus 12 via serial port 30 and a network interface 48 connected directly to bus 12. Modem 47 may provide a direct connection to a remote server via a telephone link or to the Internet via an internet service provider (ISP). Network interface 48 may provide a direct connection to a remote server via a direct network link to the Internet via a POP (point of presence). Network interface 48 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 6 to be present to practice the present invention. The devices and subsystems may be interconnected in different ways from that shown in FIG. 6. The operation of a computer system such as that shown in FIG. 6 is readily known in the art and is not discussed in detail in this application. Code to implement the present invention may be stored in computer-readable storage media such as one or more of system memory 16, fixed disk 44, CD-ROM 42, or floppy disk 38. Additionally, computer system 10 may be any kind of computing device, and so includes personal data assistants (PDAs), network appliance, X-window terminal or other such computing device. The operating system provided on computer system 10 may be MS-DOS®, MS-WINDOWS®, OS/2®, UNIX®, Linux® or other known operating system. Computer system 10 also supports a number of Internet access tools, including, for example, an HTTP-compliant web browser having a JavaScript interpreter, such as Netscape Navigator® 3.0, Microsoft Explorer® 3.0 and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 10). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 7:
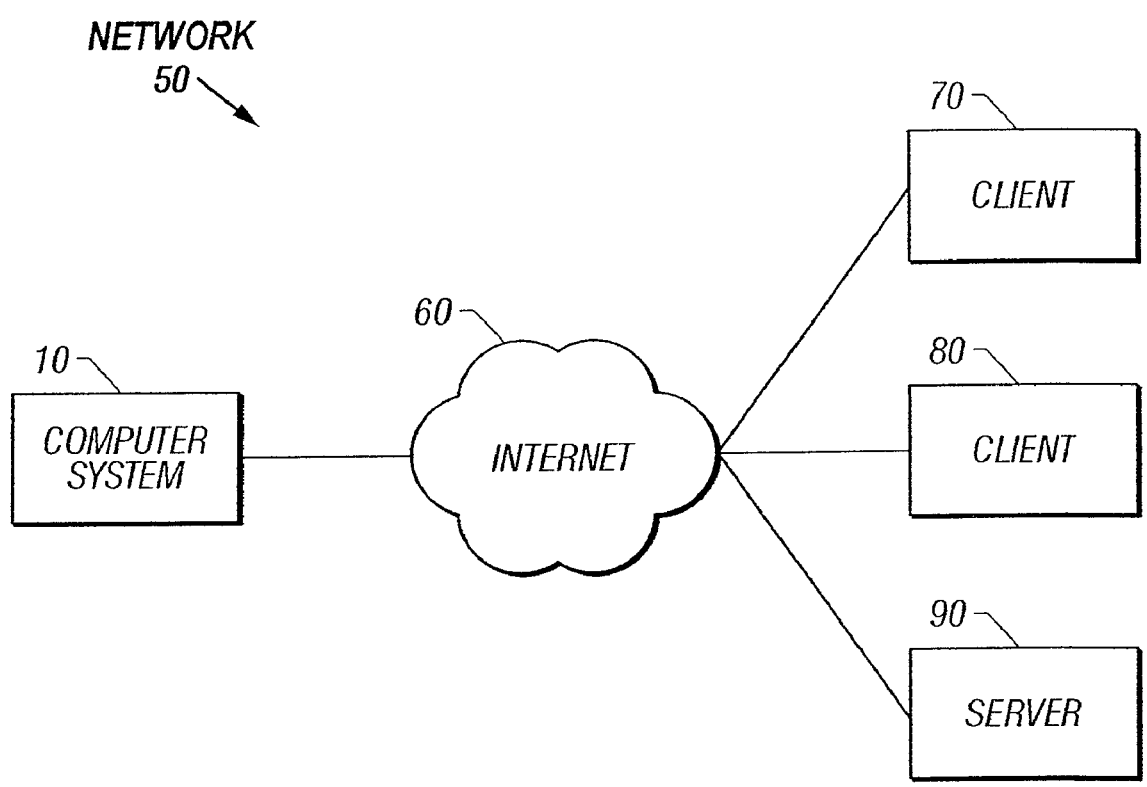
FIG. 7 is a block diagram illustrating the interconnection of the computer system of FIG. 6 to client and host systems.

FIG. 7 is a block diagram depicting a network 50 in which computer system 10 is coupled to an internet 60, which is coupled, in turn, to client systems 70 and 80, as well as a server 90. Internet 60 (e.g., the Internet) is also capable of coupling client systems 70 and 80 and server 90 to one another. With reference to computer system 10, modem 47, network interface 48 or some other method can be used to provide connectivity from computer system 10 to internet 60. Computer system 10, client system 70 and client system 80 are able to access information on server 90 using, for example, a web browser (not shown). Such a web browser allows computer system 10, as well as client systems 70 and 80, to access data on server 90 representing the pages of a website hosted on server 90. Protocols for exchanging data via the Internet are well known to those skilled in the art. Although FIG. 7 depicts the use of the Internet for exchanging data, the present invention is not limited to the Internet or any particular network-based environment.

Figure 3:
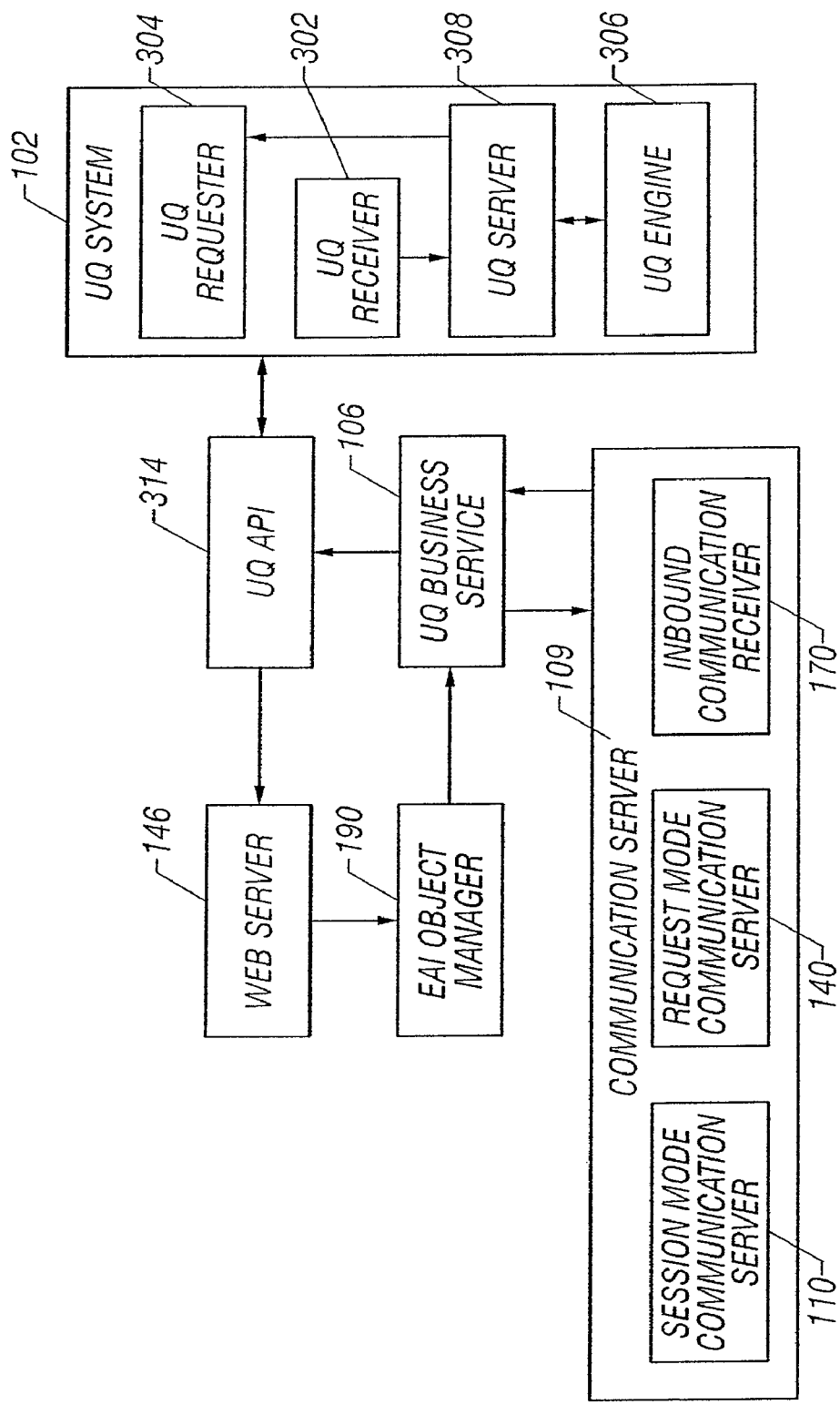
FIG. 3 shows one embodiment of a universal queuing system in accordance with the present invention.

Referring to FIGS. 1, 2 and 3, a browser running on computer system 10 employs a TCP/IP connection to pass a request to server 40, which can run an HTTP "service" (e.g., under the WINDOWS® operating system) or a "daemon" (e.g., under the UNIX® operating system), for example. Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the same using local resources (e.g., fonts and colors).

The foregoing detailed description has set forth various embodiments of the present invention via the use of block diagrams, flowcharts, and examples. It will be understood by those within the art that each block diagram component, flowchart step, and operations and/or components illustrated by the use of examples can be implemented, individually and/or collectively, by a wide range of hardware, software, firmware, or any combination thereof.

The present invention has been described in the context of a fully functional computer system, however those skilled in the art will appreciate that the present invention is capable of being distributed as a program product in a variety of forms, and that the present invention applies equally regardless of the particular type of signal bearing media used to actually carry out the distribution. Examples of signal bearing media include: recordable type media such as floppy disks and CD-ROM, transmission type media such as digital and analog communications links, as well as media storage and distribution systems developed in the future.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the spirit and scope of the invention as set forth in the following claims.

We claim:

1. A system comprising:
    a communication server configured to
        provide a media-agnostic interface to a plurality of communication channels, wherein each communication channel of the plurality of communication channels is of a unique media type,
        provide a connection between a selected communication channel and a selected client of a plurality of clients, and
        receive a request for connection to a requested agent associated with a client of the plurality of clients, wherein the requested agent is authorized to communicate using a media type of a communication channel corresponding to the request;
    a queuing system configured to
        queue the request in one of a plurality of queues, wherein each queue of the plurality of queues is correlated to a media type, and
        the request is queued in a queue corresponding to the media type of the communication channel corresponding to the request; and
    a business service, coupled to the communication server and the queuing system, and configured to
        provide communication between the queuing system and the communication server by converting information received from the queuing system into a format usable by the communication server,
        retrieve one or more rules from a data table, and
        upload the one or more rules to the queuing system, wherein
            the one or more rules are one or more of route rules and escalation rules.

2. The system of claim 1 wherein the queuing system is further configured to:
    assign a queued first request to a first agent wherein the first agent is authorized to respond to requests associated with the media type of the communication channel of the queued first request,
    transmit a first message to the communication server to connect the queued first request to a first client of the plurality of clients, wherein the first client is associated with the first agent, and
    remove the queued first request from an associated queue.

3. The system of claim 2 wherein the first message is communicated to the business service using an application programming interface (API).

4. The system of claim 2 wherein the business service is further configured to place data in the first message into a data structure usable by the communication server.

5. The system of claim 1 wherein the business service is further configured to:
    provide communication between the communication server and the queuing system by converting information received from the communication server into a format usable by the queuing system.

6. The system of claim 5 wherein the business service is further configured to:
    place the information received from the communication server into one or more of data structures, commands, and parameters usable by an API associated with the queuing system.

7. The system of claim 1 wherein the business service is further configured to provide communication between one or more clients of the plurality of clients and the queuing system.

8. The system of claim 7 wherein the business service is further configured to:
    set a state for a first agent associated with a first client of the one or more clients, wherein
        the state defines whether the first agent is ready to receive a queued request.

9. The system of claim 1 wherein the business service is further configured to:
   query the queuing system for information related to status of queued requests.

10. A system comprising:
   a communication server configured to
      provide a media-agnostic interface to a plurality of communication channels, wherein
         each communication channel of the plurality of communication channels is of a unique media type,
      provide a connection between a selected communication channel and a selected client of a plurality of clients, and
      receive a request for connection to a requested agent associated with a client of the plurality of clients, wherein
         the requested agent is authorized to communicate using a media type of a communication channel corresponding to the request;
   a queuing system configured to
      queue the request in one of a plurality of queues, wherein
         each queue of the plurality of queues is correlated to a media type, and
         the request is queued in a queue corresponding to the media type of the communication channel corresponding to the request,
      assign a queued first request to a first agent, wherein
         the first agent is authorized to respond to requests associated with the media type of the communication channel of the queued first request,
      transmit a first message to the communication server to connect the queued first request to a first client of the plurality of clients, wherein
         the first client is associated with the first agent,
      remove the queued first request from an associated queue, and
      update a state corresponding to the first agent and the queued first request reflecting an acceptance communication that the queued first request is accepted, in response to the acceptance communication; and
   a business service, coupled to the communication server and the queuing system, and configured to
      provide communication between the queuing system and the communication server by converting information received from the queuing system into a format usable by the communication server, and
      provide the acceptance communication to the queuing system from the first client associated with the first agent.

11. The system of claim 10 wherein the business service is further configured to:
   report performance statistics from the communication server and the queuing system.

12. A method comprising:
   converting information received from a queuing system into a format usable by a communication server;
   providing communication between the queuing system and the communication server by transmitting the converted information to the communication server, wherein
      the communication server provides a media-agnostic interface to a plurality of communication channels each associated with a unique media type,
      the communication server receives a request for connection to an agent of a plurality of agents, wherein the agent is authorized to communicate using a media type of a communication channel corresponding to the request, and
      the queuing system queues the request in one of a plurality of queues, wherein
         each queue of the plurality of queues is correlated to a media type, and
         the request is queued in a queue corresponding to the media type of the communication channel corresponding to the request;
   retrieving one or more rules from a data table; and
   uploading the one or more rules to the queuing system, wherein
      the one or more rules are one or more of route rules and escalation rules.

13. The method of claim 12 wherein said converting further comprises:
   placing the information received from the queuing system into a data structure usable by the communication server.

14. The method of claim 12 further comprising:
   providing communication between the communication server and the queuing system by converting information received from the communication server into a format usable by the queuing system.

15. The method of claim 14 wherein said converting information received from the communication server into a format usable by the queuing system comprises:
   placing the information received from the communication server into one or more of data structures, commands, and parameters usable by an API associated with the queuing system.

16. The method of claim 12 further comprising:
   providing communication between one or more clients and the queuing system.

17. The method of claim 16 further comprising:
   setting a state for a first agent associated with a first client of the one or more clients, wherein the state defines whether the first agent is ready to receive a queued request.

18. The method of claim 12 further comprising:
   querying the queuing system for information related to status of queued requests.

* * * * *